United States Patent [19]
Grundei et al.

[11] Patent Number: 5,615,756
[45] Date of Patent: Apr. 1, 1997

[54] SHOCK ABSORBER FOR A MOTOR VEHICLE, WHICH SHOCK ABSORBER HAS A PISTON VALVE

[75] Inventors: Manfred Grundei, Niederwerrn; Hans Reimer, Waigolshausen, both of Germany

[73] Assignee: Fichtel & Sachs AG, Schweinfurt, Germany

[21] Appl. No.: 411,990

[22] Filed: Mar. 28, 1995

[30] Foreign Application Priority Data

Mar. 30, 1994 [DE] Germany .......................... 44 10 996.2

[51] Int. Cl.⁶ .................. F16F 9/32; F16J 1/12; F16J 9/00
[52] U.S. Cl. .................. 188/322.15; 188/322.18
[58] Field of Search .................. 188/322.15, 322.18

[56] References Cited

U.S. PATENT DOCUMENTS

| | | | |
|---|---|---|---|
| 3,003,594 | 10/1961 | Bourcier de Carbon | 188/322.15 |
| 3,113,644 | 12/1963 | Wossner | 188/322.15 |
| 3,134,460 | 5/1964 | Bourcier de Carbon | 188/322.15 |
| 3,730,305 | 5/1973 | Fouts | 188/322.18 |

FOREIGN PATENT DOCUMENTS

| | | |
|---|---|---|
| 0160275 | 11/1985 | European Pat. Off. . |
| 0345561 | 12/1989 | European Pat. Off. . |
| 2693524 | 1/1994 | France .............. 188/322.15 |
| 0705845 | 5/1941 | Germany . |
| 0843780 | 7/1952 | Germany . |
| 0231290 | 1/1964 | Germany . |
| 1186292 | 1/1965 | Germany . |
| 1924668 | 9/1965 | Germany . |
| 7021105 | 6/1970 | Germany . |
| 2059682 | 6/1972 | Germany . |
| 2917318 | 11/1979 | Germany . |
| 3202721 | 8/1983 | Germany . |
| 8503460 | 9/1985 | Germany . |
| 3701557 | 8/1988 | Germany . |
| 4032609 | 1/1992 | Germany . |
| 4033186 | 4/1992 | Germany . |
| 4302624 | 5/1994 | Germany . |
| 4342755 | 6/1995 | Germany . |
| 4410996 | 6/1995 | Germany . |
| 5248473 | 9/1993 | Japan . |
| 2073367 | 10/1981 | United Kingdom .............. 188/322.18 |

*Primary Examiner*—Matthew C. Graham
*Attorney, Agent, or Firm*—Nils H. Ljungman and Associates

[57] ABSTRACT

Vibration damper, the piston valve of which is fastened to a piston rod, and which comprises a piston body with fluid passage channels which are covered by valve discs on support bodies with valve support surfaces, whereby the piston divides a cylinder tube into two work chambers by way of at least one piston ring, characterized by the fact that the piston body is realized in a disc shape, in one piece, and by way of stamping.

15 Claims, 35 Drawing Sheets

SHOCK ABSORBER FOR A MOTOR VEHICLE, WHICH SHOCK ABSORBER HAS A PISTON VALVE

BACKGROUND OF THE INVENTION

1. Field of the Invention

The present invention generally relates to a vibration damper with a piston valve, which piston valve is fastened to a piston rod. The piston rod comprises a piston body with fluid passage channels which are covered by valve discs on support bodies with valve support surfaces, whereby the piston, by means of at least one piston ring, divides a cylinder tube into two work chambers.

2. Background Information

Known vibration dampers have a piston body which is made of a sintered material. For reasons of strength, a minimum height is required, which has an effect on the stroke distance. The piston valves are generally also designed to achieve a certain type of characteristic, e.g. one which is sharply degressive. Adjustments can be made by means of advance opening discs. Therefore, standardization can be achieved only within limits.

Moreover, known pistons, particularly the piston seals, can be difficult and complex to install. For example, the piston ring in a piston ring groove may have practically no axial clearance, and would therefore frequently need to be caulked or crimped inside the piston ring groove to compensate for the clearance.

OBJECT OF THE INVENTION

The object of the present invention is to realize a piston valve which can be realized with a degressive and linear characteristic, which is insensitive to the damping force tolerance, and which has a piston ring which eliminates the disadvantages of similar known devices.

SUMMARY OF THE INVENTION

The present invention teaches that this object can be achieved if the piston body is realized in the form of a disc, in one piece, and preferably by means of stamping. Stamping can make it possible to essentially eliminate the use of sintered materials, which are essentially becoming increasingly difficult to dispose of.

Moreover, under identical load conditions, the height of the piston can essentially be reduced, which would appear to be equivalent to increasing the length of the stroke.

In an additional advantageous embodiment, starting from a piston base body, the areas of the piston body which are raised on one side of the piston can preferably be formed as recesses on the opposite side of the piston. As a result of this coordination between the support or bearing bodies and the passage channels, there is essentially no need to make radial volume displacements during the deformation. The danger of cracking in the piston and the wear to the deformation tool or die is decreased. Stronger material can also be used, which can essentially have less of a capability for flowing or fusing.

As one measure to reduce the sensitivity of the valve to tolerances, the present invention teaches that the piston body can have a support or bearing ring. The axial height of the support or bearing ring can preferably match the height of the support or bearing surfaces. By means of an automatic selection of a suitable support ring, it is essentially possible to compensate for fluctuations of tolerances in the heights of the support bodies.

In an additional advantageous embodiment, the present invention teaches that for each direction of flow, there can preferably be several passage channels which can have reference circles with essentially different radii. The result is a more uniform opening of the passage channels. It is thereby appropriate if, when an advance opening cross section is used, it is preferably formed by a valve disc in connection with at least one fluid passage channel.

To achieve a linear damping characteristic, the valve disc or discs can preferably be configured in an unshielded manner and can preferably be braced flat on the valve support surfaces. Degressive damping force characteristics can essentially be achieved by bracing at least one valve disc by means of a spring plate on the support surfaces. The valve disc, considered by itself, can essentially act like a non-return valve. In the design of the spring plate, it is highly desirable to keep the ratio of the shielding h to the material thickness s greater than or equal to the square root of 2, whereby an essentially horizontal area of the spring characteristic can be achieved which matches the position of the spring plate. As a result, the tolerance fluctuations in the heights of the support bodies essentially have no significant effect on the damping force characteristic of the piston valve.

To facilitate assembly, the present invention teaches that on at least one piston side for the spring plate, there can preferably be an angle ring which can essentially perform a centering and support function.

An additional advantageous feature of the present invention is that the piston ring can preferably cover the circumferential surface of the piston body. The piston ring can also preferably be braced axially on the top or bottom of the piston respectively. Therefore, there is essentially no need for a piston ring groove, which would essentially reduce the strength of the piston. The manufacturing operations for the piston ring can also thereby be simplified, since the height of the piston ring can exert a reduced influence on the sealing action. The range of tolerances of the piston ring height can thereby be essentially easily shifted toward a force fit, so that there can be essentially no axial clearance with respect to the piston. There can also be a significant cost advantage, since there is essentially no longer any need to make the piston ring groove by machining.

The piston ring can also have a greater height than the piston body, so that sealing lips can act as a function of the pressure. It also becomes possible to compensate for tolerances in the diameter of the piston ring.

In an embodiment of the present invention, the piston ring can preferably be realized in an elastic manner and can preferably be slipped over the piston body. Alternatively, the piston ring can be metallized or flame-sprayed or whirl-sintered onto the piston body, so that the need for installation or threading devices for the piston ring during assembly is essentially eliminated.

To reduce leakage, the piston ring can have a piston ring joint which can be formed on one hand by a notch which can preferably be located some distance from the top and bottom edge, and on the other hand by an extension which can essentially fill the notch. In the vicinity of the piston ring joint, the piston ring preferably cannot be pushed apart and leak under the pressure exerted by the damping medium.

For vibration dampers which are subjected to particularly severe mechanical and thermal loads, the piston ring preferably includes a reinforcement which can be in contact with the body of the piston and a liner which can preferably be located on this reinforcement. It also thereby becomes essentially possible to support the piston ring on the top and bottom.

It should be understood that when the word "invention" is used in this application, the word "invention" includes "inventions", that is, the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, with respect to one another.

One aspect of the invention resides broadly in a shock absorber for a motor vehicle which shock absorber comprises a cylinder. The shock absorber comprising an outer surface and the cylinder comprising a substantial portion of the outer surface of the shock absorber. The cylinder defining a chamber therein which chamber contains a damping fluid. A piston rod sealingly projecting into the cylinder and being axially displaceable with respect to the cylinder. The piston rod having a longitudinal axis defining an axial direction parallel to the longitudinal axis of the piston rod. A piston being attached to the piston rod which piston is slidably disposed within the cylinder to sealingly divide the chamber into first and second chambers. The piston comprising a piston body which piston body comprises an apparatus for permitting flow of the damping fluid between the first and second chambers. Apparatus for permitting flow of damping fluid between the first and second chambers comprising apertures which apertures are disposed in the piston body. A valve device being disposed on the piston body adjacent its corresponding apertures. A plurality of surface portions. Each surface portion being disposed on the piston body. At least one of the surface portions being disposed adjacent the apertures; the piston body being formed in the shape of a disc; piston body disc comprising a substantial portion of the piston; the piston body disc comprising a single, unitary unit; the piston body disc comprising a thickness being disposed substantially parallel to the longitudinal axis of the piston rod; the piston body disc comprising a diameter being disposed substantially perpendicular to the longitudinal axis of the piston rod; the piston body disc thickness being substantially smaller than the piston body disc diameter; the piston body disc thickness being substantially minimized while still providing the piston with a substantial and adequate strength; the chamber of the cylinder comprising a predetermined length; the piston body being displaceable through a stroke range within the chamber of the cylinder; the minimized thickness of the piston providing a substantial stroke range of the piston body within the predetermined length of the chamber of the cylinder; the stroke range of the piston being substantially greater than the stroke range of a piston of substantially the same strength having a piston body made by a sintering process.

Another aspect of the invention resides broadly in a method for manufacturing a shock absorber for a motor vehicle which shock absorber comprises a cylinder and an outer surface; the cylinder comprising a substantial portion of the outer surface of the shock absorber; the cylinder defining a chamber therein, the chamber containing a damping fluid; a piston rod sealingly projecting into the cylinder and being axially displaceable with respect to the cylinder; the piston rod having a longitudinal axis defining an axial direction parallel to the longitudinal axis of the piston rod; a piston being attached to the piston rod which piston is slidably disposed within the cylinder to sealingly divide the chamber into first and second chambers; the method comprising the steps of providing a piston body; providing an apparatus for permitting flow of damping fluid between the first and second chambers; providing apertures; providing a valve device; providing a plurality of surface portions; the method comprising the further steps of configuring the piston to comprise a piston body; configuring the piston body to comprise an apparatus for permitting flow of damping fluid between the first and second chambers; configuring the apparatus for permitting flow of damping fluid between the first and second chambers to comprise apertures; disposing the apertures in the piston body; disposing the valve device on the piston body adjacent its corresponding said apertures; disposing each surface portion on the piston body; disposing at least one of the surface portions adjacent the apertures; forming the piston body in the shape of a disc; configuring the piston body disc to comprise a substantial portion of the piston; configuring the piston body disc to comprise a single, unitary unit; configuring the piston body disc to comprise a thickness; disposing the thickness of the piston body disc substantially parallel to the longitudinal axis of the piston rod; configuring the piston body disc to comprise a diameter; disposing the piston body disc diameter substantially perpendicular to the longitudinal axis of the piston rod; configuring the piston body disc thickness to be substantially smaller than the piston body disc diameter; configuring the piston body disc to have a substantially minimized thickness while still configuring the piston to have a substantial and adequate strength; configuring the chamber of the cylinder to comprise a predetermined length; configuring the piston body to be displaceable through a stroke range within the chamber of the cylinder; configuring the minimized thickness of the piston to provide a substantial stroke range of the piston body within the predetermined length of the chamber of the cylinder; configuring the piston to have a substantially greater stroke range of than the stroke range of a piston of substantially the same strength having a piston body made by a sintering process.

BRIEF DESCRIPTION OF THE DRAWINGS

The invention is explained below in greater detail with reference to the embodiments illustrated in the accompanying figures, in which:

FIGS. 15–20 illustrate a damping force family of characteristics according to the present invention, wherein:

FIG. 15 illustrates a damping force family of characteristics in three-dimensional view;

FIG. 16 shows a decompression portion of the view of FIG. 15;

FIG. 17 is a two-dimensional side view of the view of FIG. 16;

FIG. 18 is another two-dimensional side view of the view of FIG. 16;

FIG. 19 shows a compression portion of the view of FIG. 15; and

FIG. 20 is a two-dimensional side view of the view of FIG. 19;

FIGS. 21–36 illustrate alternative embodiments of the present invention, wherein:

FIGS. 21–28 show a damping force family of characteristics;

FIG. 29 shows a load-controlled shock absorber;

FIGS. 30–34 show another load-controlled shock absorber;

FIG. 35 shows a pneumatic spring; and

FIG. 36 shows a shock absorber with a continuously adjustable damping force.

DESCRIPTION OF THE PREFERRED EMBODIMENT

Figure 1:
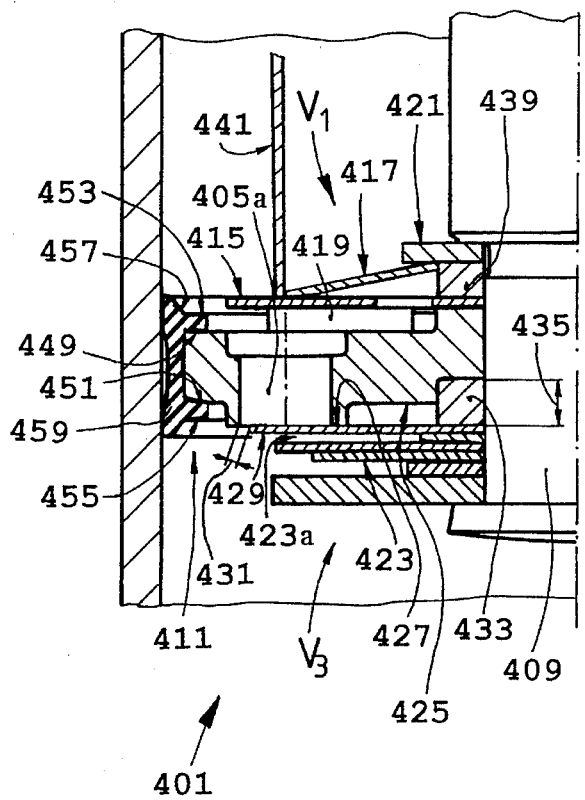
FIG. 1 shows a shock absorber piston valve with variant valve discs.
Figure 1A:
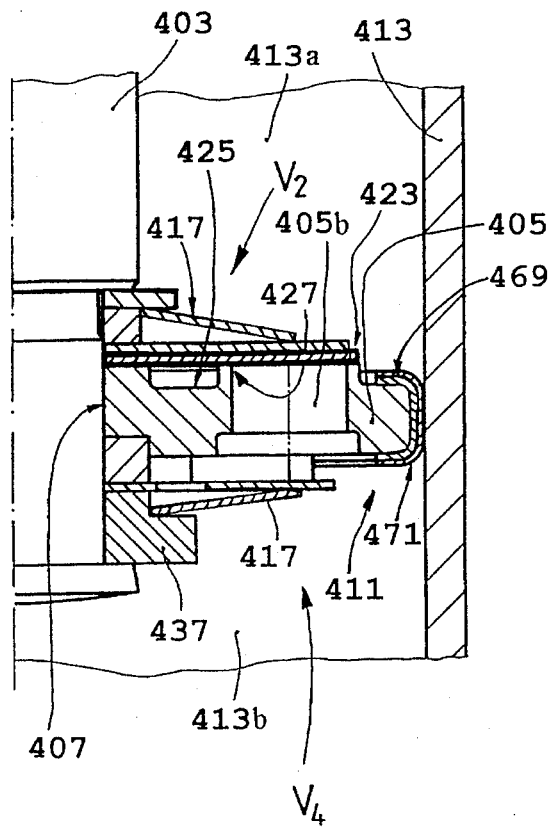
FIG. 1a shows a shock absorber piston valve with variant valve discs.

FIGS. 1 and 1a show a shock absorber piston valve 401 on a piston rod 403. A piston 405 can preferably be centered by means of a central hole 407 on a piston rod pin 409. The piston can preferably be realized in the form of a stamped disc, and can preferably be encircled by a piston ring 411. A cylinder tube 413, only portions of which are shown, is preferably divided into two work chambers 413a/413b by the piston 405. Valve discs preferably separate passage channels 405a/405b which, as a function of the stroke movement of the piston rod 403, essentially allow damping medium to overflow from one work chamber into the other, whereby a damping force is essentially produced.

In variant $V_1$, as shown in FIG. 1, a slotted valve disc 415, preferably connected internally with a spring plate 417, can be used. The slotted valve disc 415 essentially has the opening action of a non-return valve, i.e. practically without any prestress or bias. The slotted valve disc 415 can preferably be supported on support bodies 419 of the piston 405, and can preferably be braced centrally. The spring plate 417 can essentially prestress or bias the slotted valve disc 415. The spring plate 417 can preferably therefore be designed with a ratio h to s greater than or equal to the square root of 2 of the material thickness s to the shielding h so that there is essentially a nearly constant prestress or bias force over a greater band width of the fitting position, corresponding to the space between the slotted valve disc 415 and a support ring 421. On one hand, this arrangement can essentially result in a degressive damping force characteristic. On the other hand, this arrangement can result in an insensitivity to fluctuations in the tolerance of the components, which can influence the fitting position of the spring plate 417.

In an embodiment of the present invention, as shown in variant $V_1$, the slotted valve disc 415 can preferably be supported by support bodies 419. The slotted valve disc 415 is preferably prestressed by spring plate 417. For this purpose, spring plate 417 can preferably have a ratio of h to s, wherein s can preferably indicate the thickness of spring plate 417 measured between two major surfaces of the spring plate 417. Further, h can preferably indicate the height of the same spring plate 417 in that area where the spring plate 417 lies between support ring 421 and valve disc 415. The ratio of h to s can preferably be greater than or equal to the square root of 2. The height at which spring plate 417 is located can preferably be greater than the thickness of the spring plate 417 itself. The resulting prestress can essentially effect a degressive damping force. The resulting prestress can also essentially make possible an insensitivity to fluctuations in the damping force for the other components.

In variant $V_2$, as shown in FIG. 1a, a degressive-linear characteristic can be produced by a packet or stack of flat valve discs 423 which can preferably be braced or biased as well as pressurized by a spring plate 417. It is highly desirable to essentially guarantee that the valve discs 423 on the central hole 407 are at the same distance from the piston base 425, as from the support surfaces 427, otherwise there can essentially be large fluctuations in the damping force.

Therefore, as shown in FIG. 1a, in an embodiment of the present invention, flat valve discs 423 can preferably uniformly abut the contact surfaces 427. Contact surfaces 427, therefore, preferably lie in the same plane consistently along the surface of valve discs 423. The plane being oriented perpendicular to the longitudinal axis of the piston rod. Otherwise, any area of contact surfaces 427 extending beyond such a plane would essentially cause valve discs 423 to essentially be pressed away from passage channel 405b thereby causing essentially greater fluctuations in the damping force.

Variant $V_3$, as shown in FIG. 1, shows a piston valve which essentially has a purely linear damping force action. An elastic first valve disc 429 can thereby cover the outlet of the passage channel 405a except for an advance opening 431. Even if there is a small influx, the first valve disc 429 can lift up until a vertically downward stroke, which can preferably be determined by a spacer disc 423a, has been travelled, and the total valve disc packet is active. The spacer disc 423a can thereby preferably be used to prevent rattling noises which can occur, in particular, when there are small stroke movements of the piston rod 403. Such rattling noises can be caused by the initial breakaway movement of the piston rod.

Therefore, as shown in FIG. 1, in accordance with an embodiment of the present invention, variant $V_3$ shows a linear damping action in that each of the discs can preferably be aligned in abutment without the use of spring plate 417, for example. With such a linear damping force action, the first valve disc 429 can preferably be the first disc to open upon influx of damping fluid. After first valve disc 429 opens and reaches a certain point, first valve disc 429 abuts spacer disc 423a which spacer disc 423a can essentially be a smaller disc. When the first valve disc 429 reaches this point, the adjacent disc packet can essentially become activated, thereby causing the valves to open substantially quickly. Essentially, in an embodiment of the present invention, there can be a quick opening of the valves, owing to the configuration of variant $V_3$, as shown in FIG. 1. Essentially the greater the force of the damping fluid flow, the more quickly the valve discs 429, 423a, and 423 can preferably open and activate together. The degree to which the valve discs 429, 423a, and 423 can open can essentially be a direct result of the damping flow itself.

As noted above with reference to variant $V_2$, it is highly desirable in variant $V_3$ that the contact surfaces 427 essentially lie in a plane over substantially the entire surface of the valve disc 429. For that purpose, a support ring 433 can preferably be introduced into the piston. The height of support ring 433 preferably matches the axial distance between the support surfaces 427 and the base 425 of the piston. During manufacture it is essentially possible to measure a basic depth 435 by means of a pin, or other suitable instrument, and thus to essentially select a support ring 433 from a parts inventory. The height of support ring 433 is preferably exactly equal to the depth 435. In this manner, even linear damping force valves can be tuned correctly.

As shown in FIG. 1, in an embodiment of the present invention, the support ring 433 can preferably be designed to maintain contact surfaces 427 along the same plane in the areas where contact surfaces 427 abut valve disc 429.

The variant $V_4$ is largely equivalent to variant $V_1$. One difference is that in variant $V_4$ an angle ring 437 can preferably be used. The angle ring 437 can exert a centering and support function with respect to the spring plate 417 by means of its surfaces facing the spring plate 417. If, as in $V_1$, a separate centering and a support disc 439 were used, during the assembly process, before the riveting of the entire piston valve, a centering sleeve 441 for the spring plate 417, not yet guided up to this stage of the assembly, could essentially be placed on the rivet head side. It goes without saying that one of the variants $V_1$ to $V_4$ can be realized on each piston side, so that a significant degree of standardization can be achieved.

It will be appreciated from the disclosure heretofore that, in accordance with at least one preferred embodiment of the present invention, any of the variants $V_1$ through $V_4$ may be used exclusively, that is, on both sides of a piston. Or, if appropriate, a combination of the variants $V_1$ through $V_4$ may be used, that is, one variant on one side of the piston and another variant on the other side.

Figure 2A:
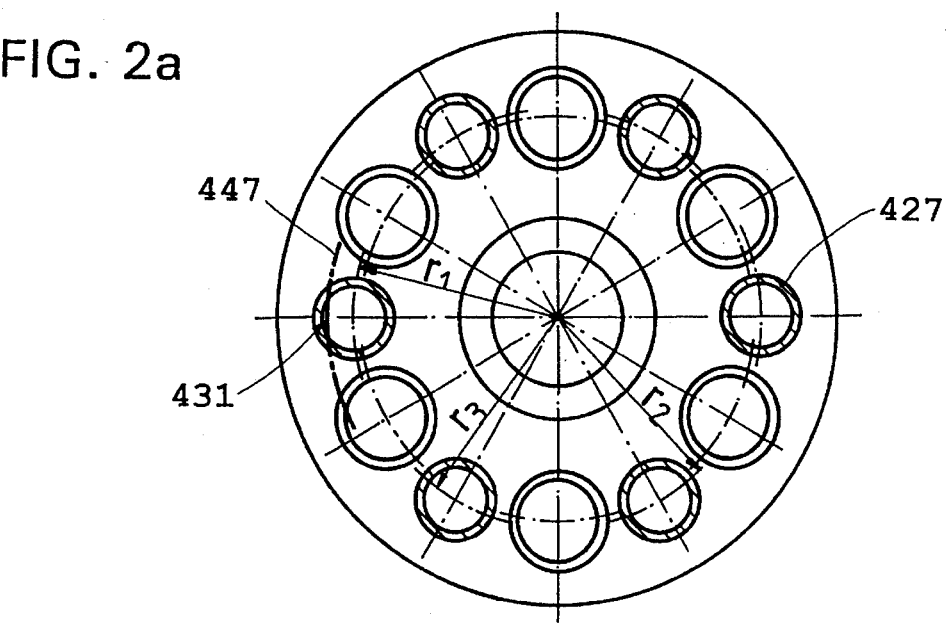
FIGS. 2a–c show the piston in detail.
Figure 2B:
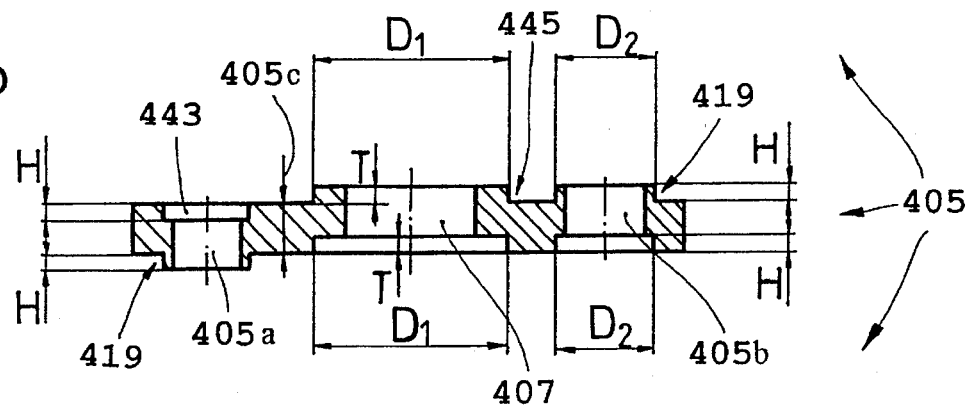
Figure 2C:
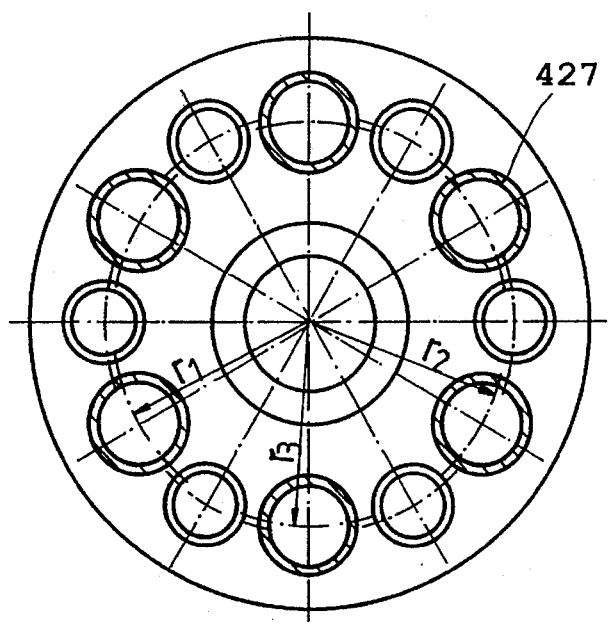

FIGS. 2a to 2c illustrate the piston 405 in detail in accordance with a preferred embodiment of the present invention. The piston 405 can be a stamped part, on which, starting from a supposed piston base body 405c, the deformations, e.g. for the support bodies 419, can preferably be realized so that the height H of the support bodies 419 is essentially identical to the depth H of an entry 443 into the passage channel 405a. The same can preferably be true for the vicinity of the central hole 407, in which the basic depth 435 of a pin for the support ring 433 is preferably essentially identical to the shoulder 445 on the opposite side. Consequently, all the corresponding diameters $D_1$ of the shaped areas are preferably identical. Similarly, all the corresponding diameters $D_2$ of the shaped areas are preferably identical. The strain hardening or work hardening which thereby occurs is the reason for the low height of the piston.

The piston 405 can preferably be stamped and designed as one piece. In an embodiment of the present invention, there can preferably be recessed areas and raised areas designed in each substantial surface of the piston 405. For each recessed area which can be designed in one surface of piston 405, there can preferably be a corresponding raised area designed in the opposite side of piston 405. Similarly, for each raised area located in one surface of piston 405, there can preferably be a corresponding recessed area located in the opposite surface of piston 405. Such an arrangement, in an embodiment of the present invention, of corresponding raised and recessed areas essentially provides the piston 405 with a substantially minimized thickness yet still provides the substantial strength of piston 405. As a result of the substantially minimized thickness of the piston 405, the stroke range of the piston 405 within the cylinder 413 can essentially be greater than the stroke range of sintered piston, for example.

The passage channels 405a/405b in each flow direction lie on different reference circles $r_1$, $r_2$, $r_3$. The overhead views (FIGS. 2a, 2c) of the piston 405 show the hatch-marked support surfaces 427, on which the valve disc, symbolized by the arc segment 447, preferably lies. The passage channel on the largest reference circle $r_1$ thereby preferably forms advance opening cross section 431, whereby with an increasing descending vertical stroke of the valve disc, the passage cross section is continuously enlarged to the desired extent, as the passage channels on the reference circles $r_2$, $r_3$ lying radially farther inward open.

Thus, the passage channels 405a/405b can preferably be located along various radii $r_1$, $r_2$, $r_3$ within the piston 405. The valve disc can preferably be designed to abut and cover essentially each of the passage channels 405a/405b except in the advance opening cross section 431.

The dimensions of the radii $r_1$, $r_2$, and $r_3$, for example, can preferably include the following proportions respectively: about 3 cm., about 3.1 cm., and about 3.2 cm.; or about 3.1 cm., about 3.2 cm., and about 3.3 cm.; or about 3.2 cm., about 3.3 cm., and about 3.4 cm.; or about 3.3 cm., about 3.4 cm., and about 3.5 cm.; or about 3.4 cm., about 3.5 cm., and about 3.6 cm.; or about 3.5 cm., about 3.6 cm., and about 3.7 cm.

Of course, the passage channels 405a/405b for the one flow direction can lie on reference circle radii which are different from those for the opposite flow direction, so that with identical valve discs, directionally-dependent advance opening cross sections can be achieved.

The disclosure turns to a description of additional components as shown in FIGS. 1 and 1a, wherein the piston 405 preferably has a piston ring 411 which is made of plastic. The piston ring 411 is preferably supported by means of corresponding retaining surfaces 449, 451 on the top and bottom of the piston 405. Seal lips 457,459 are preferably adjacent to the cover surfaces 453, 455 of the piston ring 411. The seal lips 457,459 can preferably be in elastic contact as a function of the operating pressure in the cylinder tube 413. The retaining surfaces 449, 451 thereby preferably prevent the axial displacement of the piston ring 411.

In an embodiment of the present invention, seal lips 457, 459 can preferably have an outer circumference greater than the inner circumference of cylinder tube 413 making possible an operating pressure between the piston 405 and cylinder tube 413 as the piston 405 can preferably be slideably displaced along the inside surface of cylinder tube 413.

In accordance with at least one preferred embodiment of the present invention, seal lips 457 and 459 may preferably be made of a suitable material, such as a flexible of elastic material.

There are several possibilities for the assembly of the piston ring 411. For example, the piston ring 411 can be metallized or flame-sprayed or whirl-sintered onto the piston 405. In that case, there will preferably be no piston ring joint 461 (FIG. 3), which would likely inevitably entail some leakage, however small. The assembly of the modular unit which includes the piston 405 and piston ring 411 is also facilitated.

Figure 3:
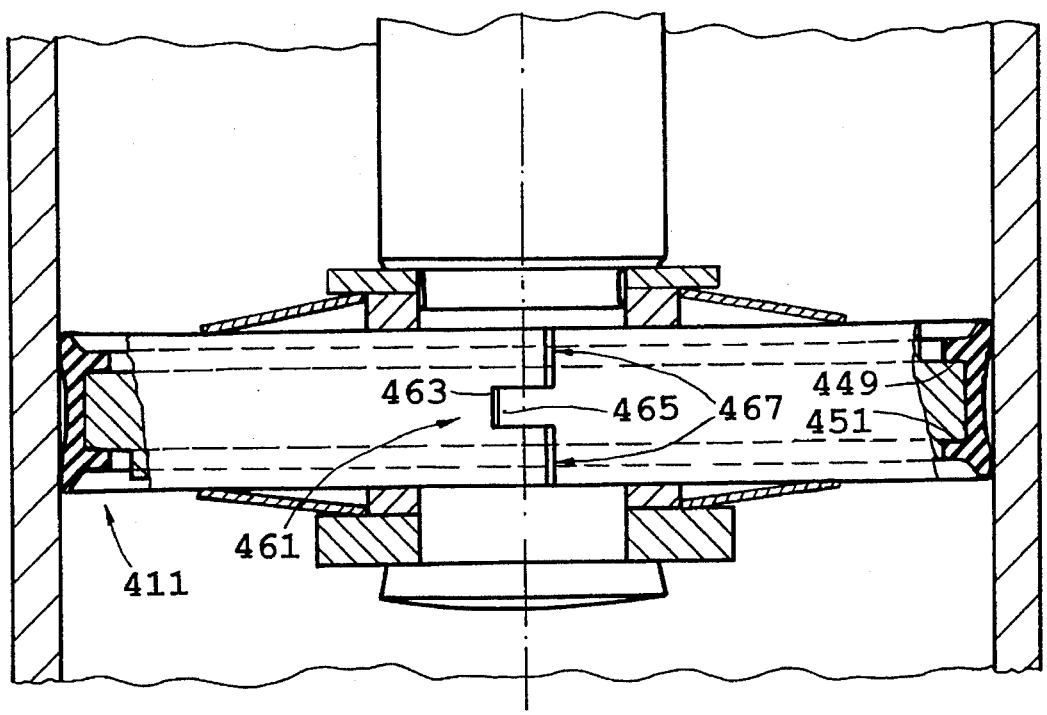
FIG. 3 shows a shock absorber piston valve with a piston ring, in a plan view.

Alternatively, rolled band material can be used, which closes the piston ring 411 by means of a piston ring joint 461. In FIG. 3, such a variant embodiment is realized in which the one end of the piston ring 411 has a notch 463 at some distance from the upper and lower edge, in which an extension 465 on the other end of the piston ring 411 is engaged.

In an embodiment of the present invention, an elastomer piston ring joint 461 can preferably be formed around piston ring 411. The elastomer piston ring joint 461 can preferably surround and seal the piston ring 411. The abutment of extension 465 into notch 463 essentially makes possible a positive fit of piston ring joint 461 around piston 405.

During a stroke movement, damping medium will likely inevitably penetrate into the area 467 of the piston ring joint 461. The pressure acts on the extension 465 and exerts a force in the direction of flow on the extension 465. By means of the retaining surfaces 449, 451, the piston ring 411 is supported in the axial direction, so that the piston ring joint 461 essentially cannot be opened. The piston ring joint 461 can essentially function in a corresponding manner in the reverse direction of flow. Pistons which are higher, or thicker, make possible the presence of a multiplicity of such piston rings joints 461, so that there can be a labyrinth seal.

In accordance with an embodiment of the present invention, the piston 405 can preferably be formed by means of a die essentially having two halves which press or stamp out the disc and its components. The draft of the disc components can preferably be tapered, not straight, so that the tool die can be essentially easily withdrawn from the disc during manufacture without the component sticking to the die. Furthermore, there will essentially be no flow of material as occurs with sintering, for example. There can essentially be therefore a clean separation from the die as well as a constant and uniform thickness of the piston 405. Such a thickness can thereby essentially contribute to the strength of the piston 405.

One possible example of a process for forming such a piston may be disclosed in U.S. Pat. No. 5,301,414 entitled "Process for Shaping a Reinforcement of the Extremities of the Internal Casing of an Elastic Joint, after Molding, and its Applications", filed on Jul. 20, 1992, having inventor Michel Gautheron.

Additional examples of processes for forming such a piston may be disclosed in the following publications:

"Metalworking Technology" on pages 210–212 and on page 224, by author Richard L. Little, having a publication date of 1977, and published by McGraw-Hill Book Company; and "Metal Forming" on pages 5–36; pages 143–147; page 304; and pages 231–232; by authors T. Altan, S. Oh, and H. Gegel, having a publication date of 1983, and published by American Society for Metals.

Some examples of processes which may be used for forming a piston valve in accordance with the present invention may include the following: pressure deformation, pressing, coining, closed die-forging, electro-upsetting, forging, stamping, spinning, drop-hammer forming, magnetic pulse forming, screw machining, androforming, age forming, hobbing, orbital forging, gear rolling, turning on a lathe, or wedge rolling.

In FIG. 1a, a piston ring 411 is inserted which is realized in the form of two shells. A reinforcement 469, on which a liner 471 is applied, is in contact inwardly on the piston 405. The piston ring 411 has a U-shaped cross section and is supported by means of retaining surfaces 449, 451 on the top and bottom of the piston 405. As delivered, the piston ring 411 is realized slightly larger than the cylinder tube 413. The piston ring 411 is introduced during the assembly process by means of a device (not shown), whereby the piston ring 411 is prestressed with respect to the cylinder tube 413.

The reinforcement 469 increases the allowable transverse force and high-temperature strength, whereby the liner 471 produces favorable sliding properties. With regard to the piston ring joint 461, joints which run axially and diagonally are possible, as are joints like the one illustrated in FIG. 3, whereby the wall thickness of the piston ring 411 is determined as a function of the other requirements of the respective embodiment. Theoretically, the thicker the piston ring 411, the more likely it is that the variant will be realized with the T-shaped piston-ring joint 461 illustrated in FIG. 3.

Figure 4:
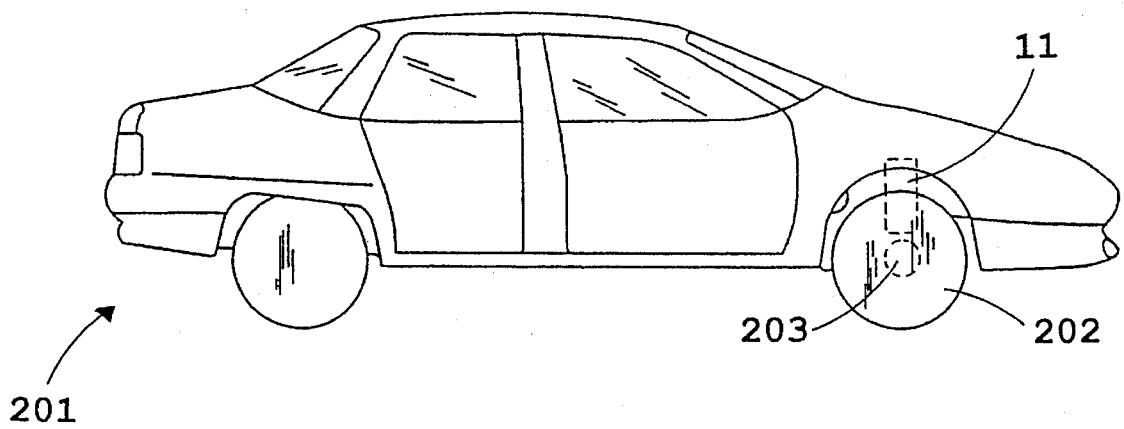
FIG. 4 illustrates an automobile which may employ a shock absorber according to the present invention.

FIG. 4 illustrates an automobile 201 which may employ a shock absorber in accordance with the present invention. In a known manner, a wheel 202 is supported by an axle 203. Substantially in the vicinity of wheel 202, a shock absorber 11 is preferably connected, in a known manner, between axle 203 and the body of the automobile 201.

Figure 5:
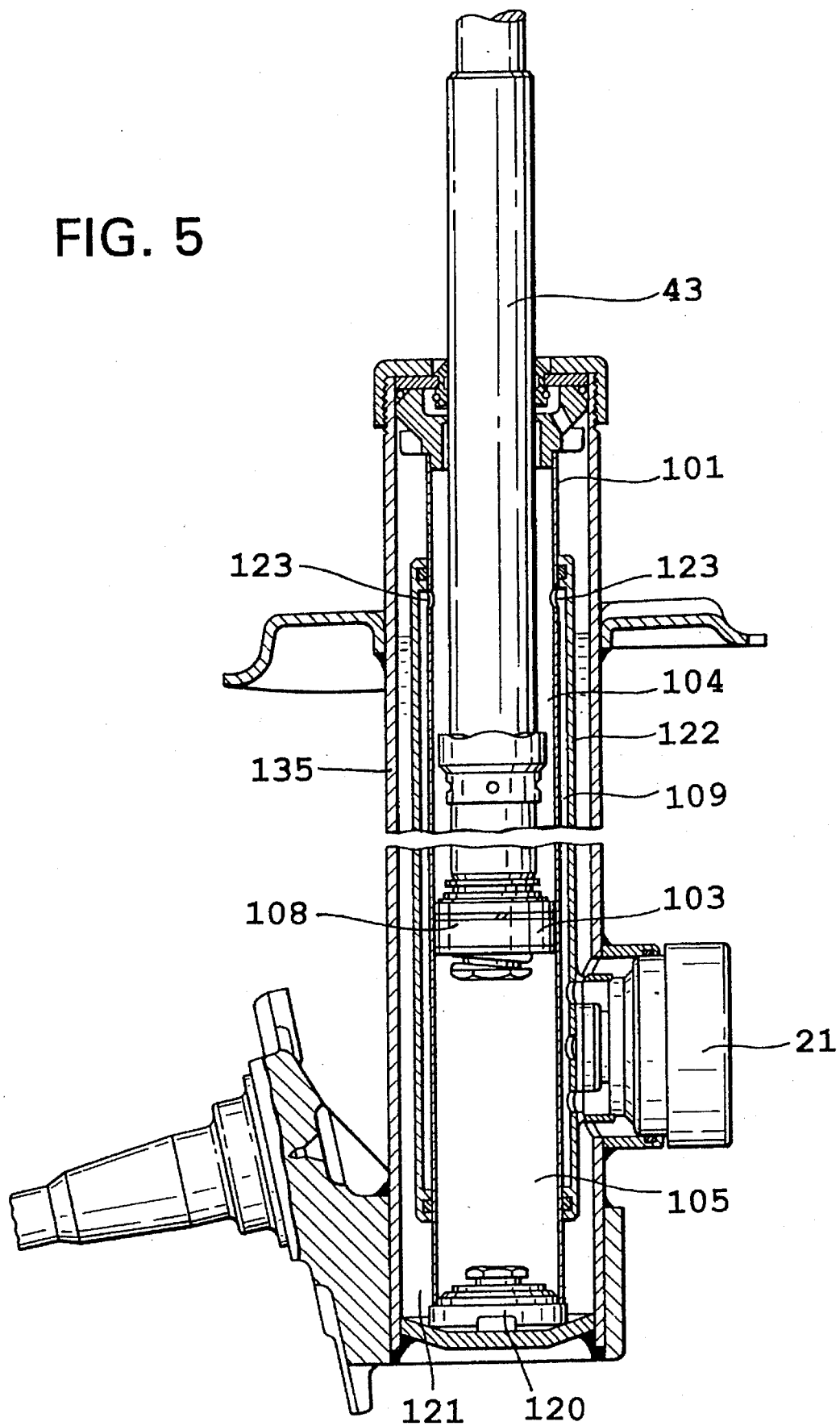
FIG. 5 is a general view of a shock absorber which may be configured in accordance with the present invention.

FIG. 5 shows an example of a shock absorber which may be employed in accordance with the embodiments of the present invention. As illustrated in FIG. 5, an adjustable two-tube shock absorber can generally include a cylinder 101, which sealingly contains a hydraulic fluid, a piston rod 43, which piston rod 43 can sealingly project into cylinder 101 and which piston rod 43 can be axially displaceable with respect thereto, and a damping piston 103, which damping piston 103 can be sealingly disposed within cylinder 101 and can be connected to piston rod 43. Piston rod 43 can be attached to a structure portion, e.g., of a vehicle, which is not shown. Piston 103 can divide cylinder 101 into upper and lower working chambers 104 and 105, respectively, and can be provided with axially throughgoing passages and associated bottle valves 108 of conventional design and well known in the art, which can provide a substantially constant and non-variable resistance to the axial displacement of piston 103 and piston rod 43.

Two additional cylinders of progressively greater diameter 122 and 135 can be disposed coaxially with cylinder 101, so as to surround cylinder 101, thereby providing two additional annular chambers, a bypass chamber 109 and an equalization chamber 121. Bypass chamber 109 can preferably interconnect with the working chambers via orifices 123, and a valve 120, located at the bottom of cylinder 101. The bypass chamber 109 can preferably provide a means by which the damping medium contained therein can reach equalization chamber 121.

A damping force control unit 21, which can act hydraulically in parallel with throttle valves 108 to modify the substantially constant damping force which throttle valves 108 can provide, can be mounted as a separate component attached to the shock absorber, and can be in fluid communication with bypass 109 and equalization chamber 121.

Figure 6:
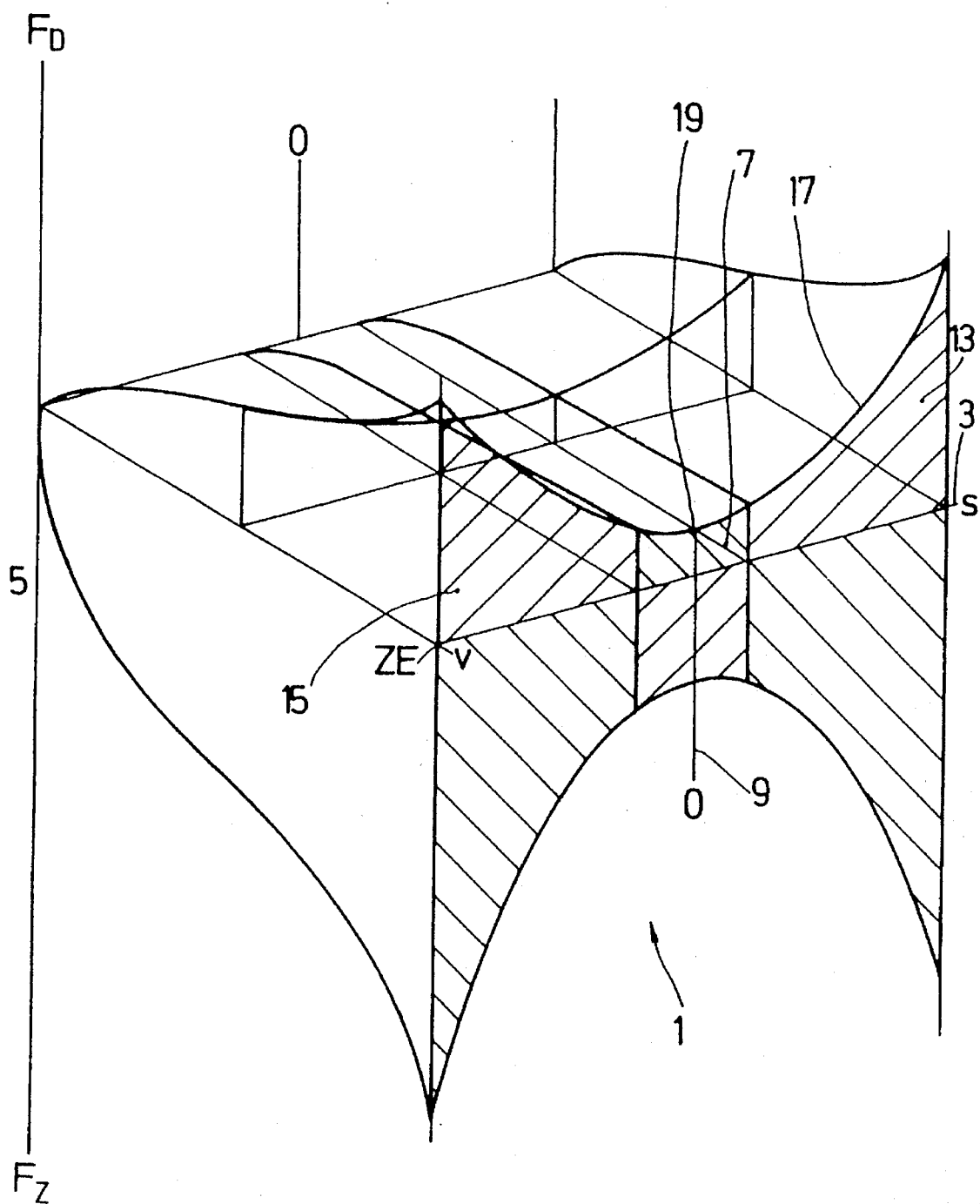
FIG. 6 illustrates a damping force family of characteristics.

FIG. 6 shows a damping force family of characteristics 1, which is plotted as a function of the stroke (s-axis) 3 and velocity (v-axis). In terms of the stroke, the damping force family of characteristics 1 is preferably divided into at least three individual damping force families of characteristics. A first damping force family of characteristics 7 preferably lies in the range of the normal stroke position 9 of a shock absorber 11. The maximum stroke range of the first damping force family of characteristics 7 can preferably be restricted to approximately the spring deflection which is transmitted by one tire to the shock absorber, when the car is travelling over a manhole cover or cobblestone streets. The minimum stroke range is approximately on the order of the roughness of the road. Adjacent to the first damping force family of characteristics are the damping force families of characteristics 13 and 15, which can preferably be employed when a larger spring deflection is required.

In relation to the velocity axis 5, the first damping force family of characteristics 7 preferably has a very degressive damping force characteristic 17, with a correspondingly low damping force peak at the maximum spring deflection velocity. The damping force families of characteristics 13 and 15 each preferably have a damping force curve which, at relatively low velocities and/or in the vicinity of the first damping force family of characteristics 7, has a degressive damping force behavior, but which, with increasing spring deflection velocity in the stroke range near the limit positions of the shock absorber, preferably assumes a sharply progressive damping force behavior.

The damping force family of characteristics 1 can be realized particularly well in a level-controlled shock absorber, since the normal stroke position 9 of the shock absorber, regardless of the load status of the vehicle, can usually always be kept in the first damping force family of characteristics 7. Alternatively, of course, it is also possible to design the damping force family of characteristics 1 as a function of the load. The bottom 19 of the curve of the damping force characteristic 17 would thus be shifted in the decompression direction (indicated in FIG. 6 as "ZE").

Figure 7:
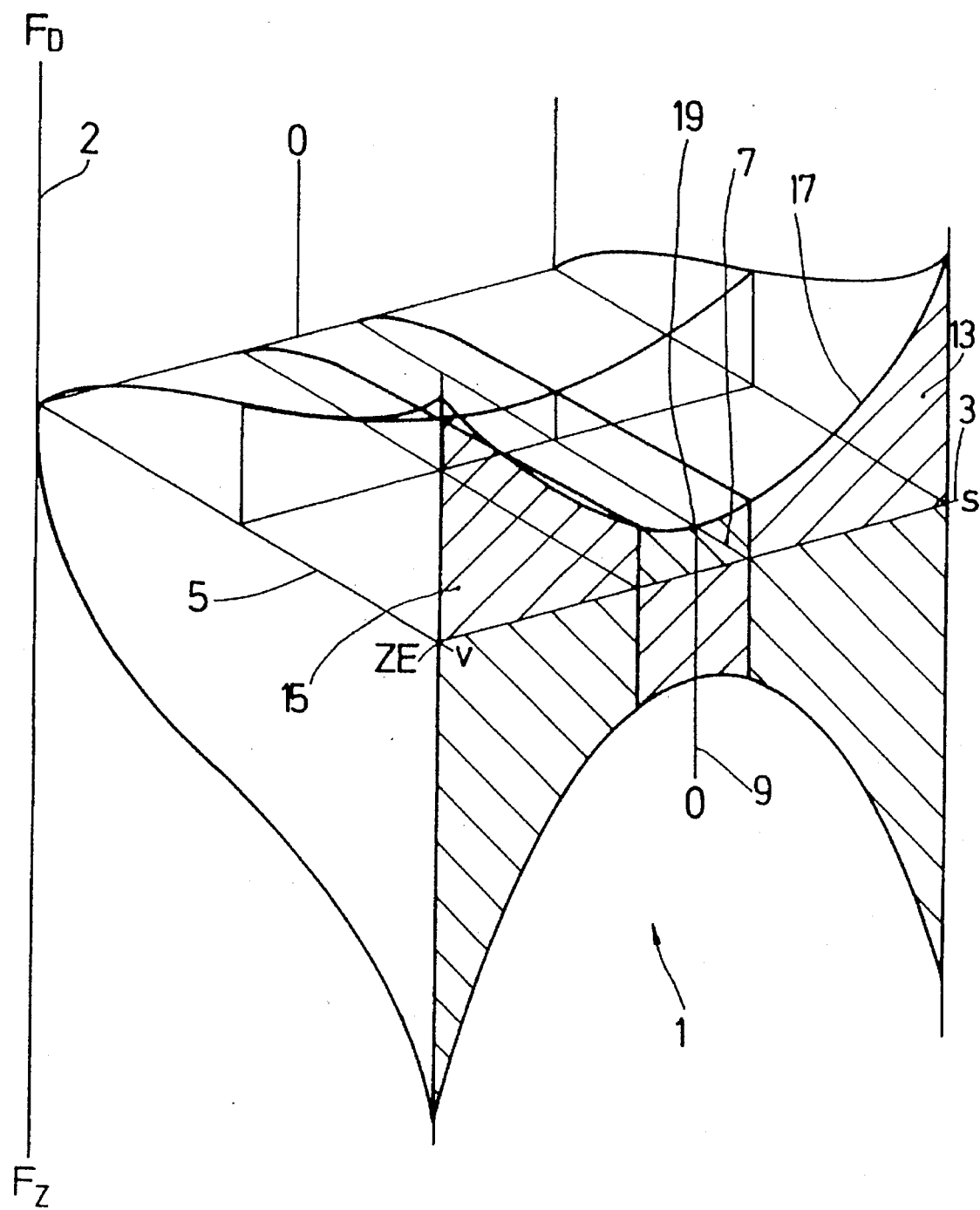
FIG. 7 is substantially the same view as FIG. 6, but more detailed.

Thus, in accordance with a preferred embodiment of the present invention, FIGS. 6 and 7 illustrate a damping force family of characteristics 1 according to the present invention. The force axis, which is vertical, is indicated at 2, while the stroke axis, or the "s-axis", is indicated at 3 and the velocity axis, or "v-axis", is indicated at 5. As viewed along the s-axis 3, the damping force family of characteristics is preferably divided into three individual damping force families of characteristics 7, 13 and 15. As illustrated, a first damping force family of characteristics 7 preferably straddles the normal stroke position 9 of the shock absorber in question.

Figure 8:
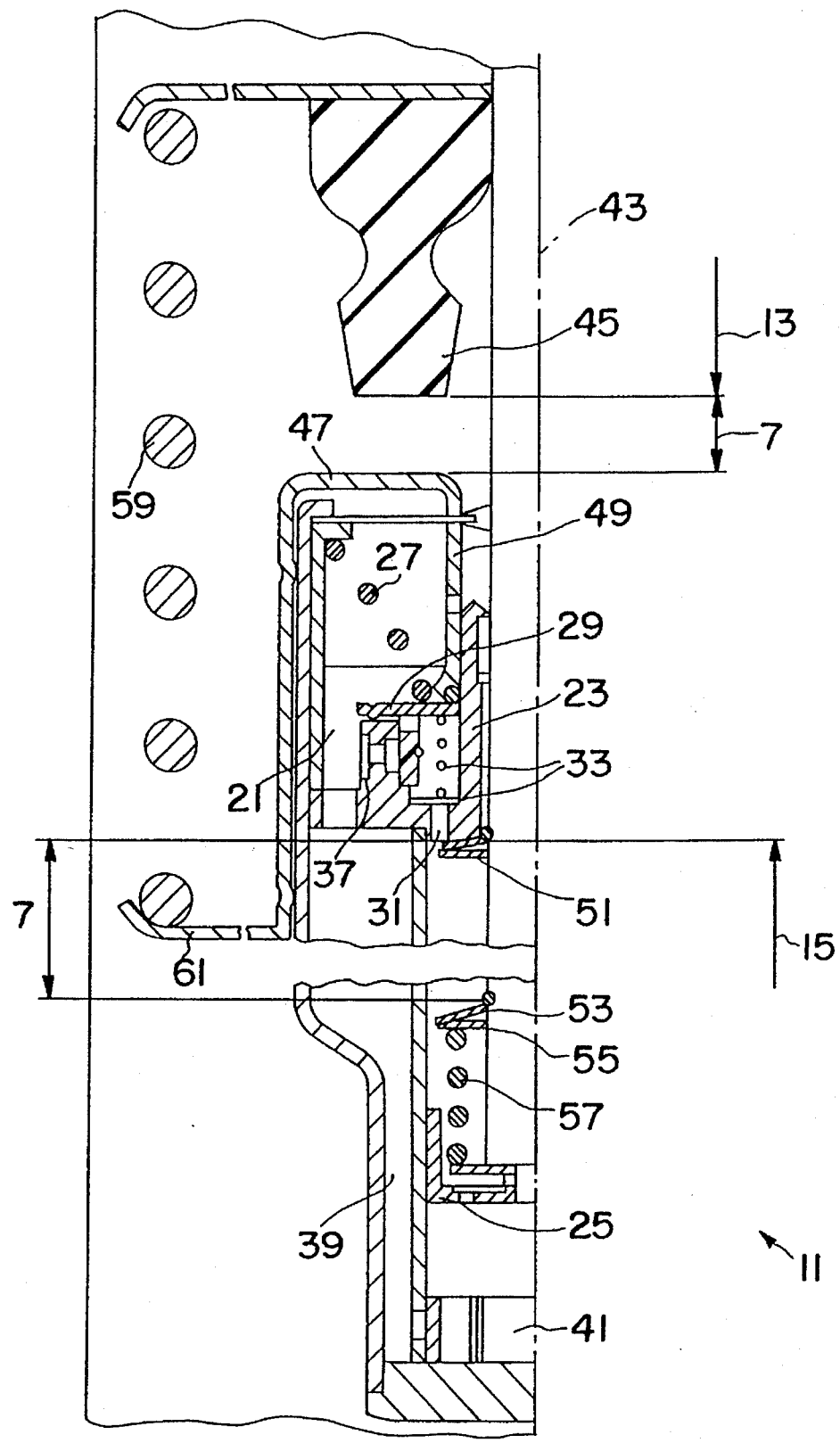
FIG. 8 illustrates a load-controlled shock absorber.

FIG. 8 shows one possible embodiment of a shock absorber 11 according to the present invention, in which a damping force family of characteristics with a shifted bottom 19 of the curve is realized. The damper is preferably realized in the form of a spring strut, whereby there is preferably a damping force device 21 in the upper end region of the shock absorber 11 inside a piston rod. The damping device 21 preferably transmits the flow in only one direction, so that the same damping force can be exerted in the decompression and in the compression direction, since the piston valve 25 is preferably designed as a non-return valve. The basic damping force is preferably generated by a very weak conical wire spring 27, which preferably pushes a valve disc 29 against a valve seat 30 (see FIG. 9). The displaced damping medium preferably flows through the piston rod guide 23 through an inflow passage 31, the inflow passage 31 being equipped with a non-return valve 33. An outflow passage 35 (see FIG. 9), which also has a non-return valve 37, preferably forms the connection to an equalization chamber 39. The equalization chamber 39 preferably communicates with the work chamber via a non-return valve 41 in the form of an elastic slotted ring.

When the spring is deflected, a piston rod 43 is preferably inserted into the shock absorber 11. The damping medium flows through the damping device 21 and reaches the equalization chamber 39. Preferably, within the spring deflection in the insertion direction, between a compression pad 45 and a stop surface 47 of a control sleeve 49, starting from the deflection point at which a hydraulic-mechanical decompression stop 51 has just been tripped, the damping force family of characteristics 7 is located, and has a basic damping force which is defined by the conical coil spring 27. For the remainder of the spring deflection, the pressure pad 45 preferably presses against the control sleeve 49 and thereby increases the pre-stress on the valve disc 29. This spring deflection is in the damping force family of characteristics 13. In the reverse deflection direction, when the hydraulic-mechanical decompression stop 51, comprising a disc 55 braced between a spring plate 53 and a coil spring 57, together with the piston rod 43 has reached the inflow channel 31 on the piston rod guide 23, the damping force family of characteristics 15 preferably begins, whereby the spring plate 53, by interacting with the disc 55, preferably reduces the cross section of the inflow channel 31 and thus allows the damping force to increase.

The basic setting of the damping force generated by the conical coil spring 27 can preferably be superimposed in an additive manner on a vehicle suspension spring 59, since the plate spring 61 preferably transmits the spring force to the control sleeve 49. With this measure, the shock absorber can be load-controlled, and thus the position of the damping force characteristic trough 19 can preferably be shifted in the decompression direction. Of course, this embodiment of a shock absorber can also be designed so that it operates independently of the load, by disabling the transmission connection between the spring plate 61 and the control sleeve 49.

Figure 9:
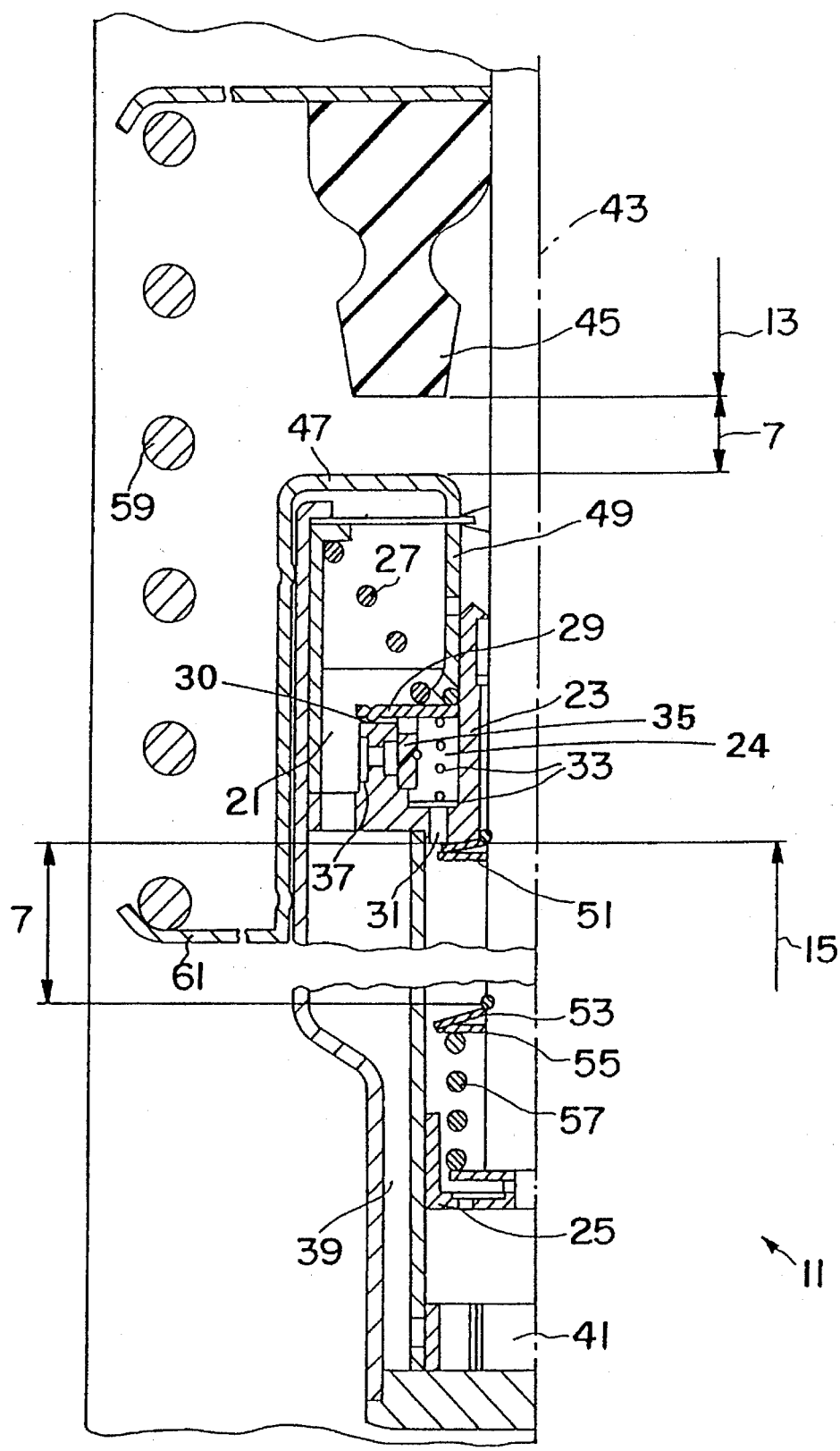
FIG. 9 is substantially the same view as FIG. 8, but more detailed.

Thus, in accordance with a preferred embodiment of the present invention, as illustrated in FIGS. 8 and 9, damping device 21 preferably transmits damping medium only in one direction, whether the shock absorber is undergoing compression or decompression. As such, both during compression and decompression, damping medium is preferably transmitted through inflow passage 31 and non-return valve 33 to chamber 24 and outflow passage 35. From outflow passage 35, the damping medium preferably flows out through non-return valve 37 and subsequently to equalization chamber 39.

It should be understood that, when the first damping force family of characteristics 7 is in effect, damping medium will also preferably flow out from chamber 24 between valve disc 29 and valve seat 30. However, essentially from the point that stop surface 47 of control sleeve 49 contacts pressure pad 45, the damping force family of characteristics 13 will preferably be in effect. Particularly, when pressure pad 45 presses against control sleeve 49, the prestress of valve disc 29 against valve seat 30 is essentially increased, thereby inhibiting the flow of damping medium between valve disc 29 and valve seat 30. Preferably, in accordance with a preferred embodiment of the present invention, as a function of the degree of prestress, or compressive force, on valve disc 29, which would essentially bias the same more towards valve seat 30, the flow of damping medium is preferably constricted in such a manner as to increase the damping force as a function of stroke.

Preferably, if the piston rod 43 is displaced in a direction opposite from pressure pad 45, the damping force family of characteristics 15 will come into effect when decompression stop 51 reaches the mouth of inflow channel 31. At that point, with greater stroke, the degree of closure of inflow channel 31 will essentially preferably increase in a manner which preferably results in the damping force family of characteristics 15.

Preferably, the basic force of damping spring 27 may be supplemented by the force provided by a vehicle suspension spring 59, wherein the prestress provided by vehicle suspension spring 59 could conceivably be preset so as to vary the position, with respect to the graph shown in FIGS. 6 and 7, of the damping force characteristic trough 19. For operation independent of the load provided by vehicle suspension spring 59, the force transmission connection between spring plate 61 and control sleeve 49 could be disabled.

Figure 10:
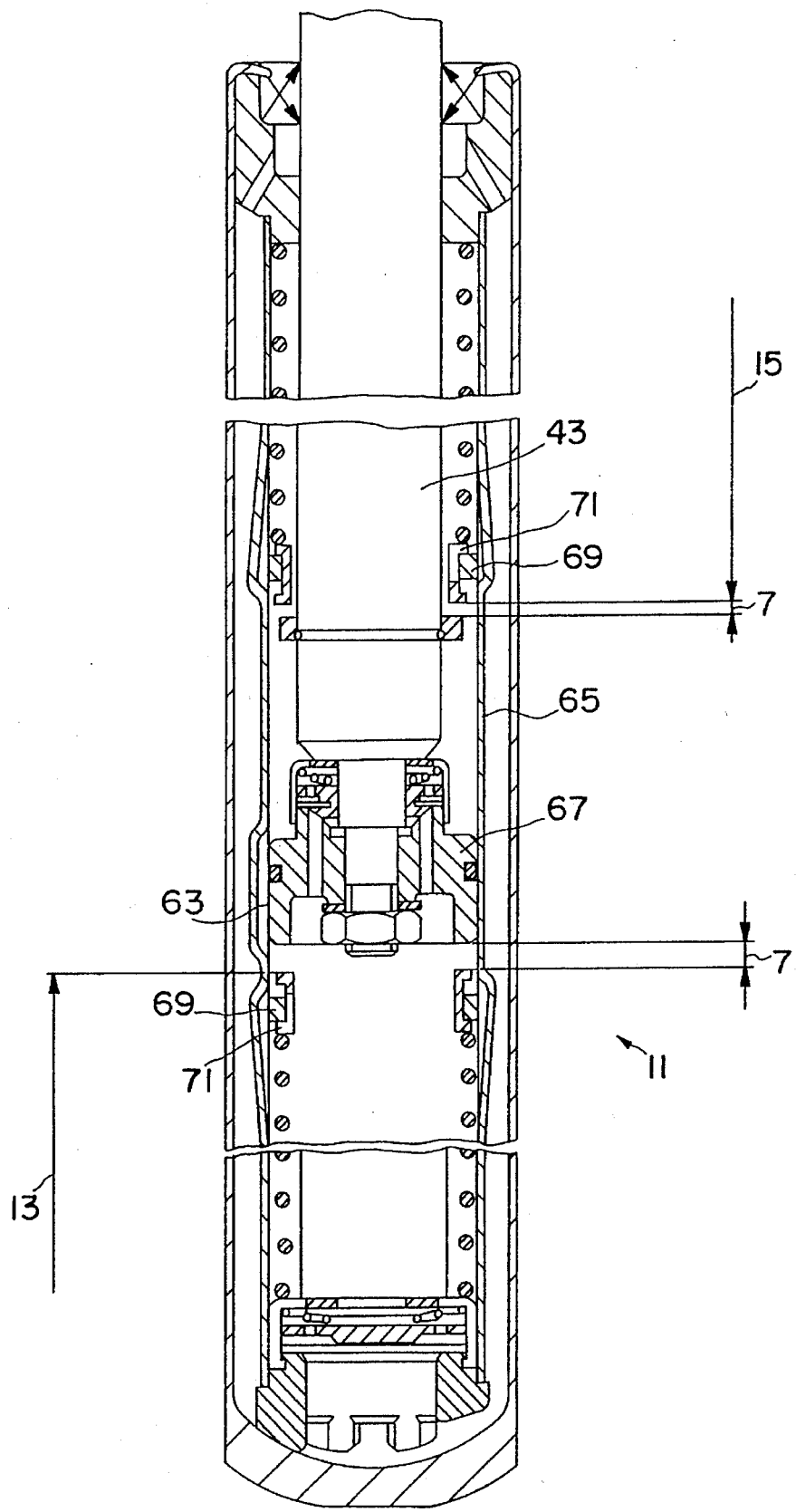
FIG. 10 illustrates a shock absorber with a bypass channel.

FIG. 10 illustrates a shock absorber 11 in a two-tube configuration with a basic layout which may preferably be essentially the same as known shock absorbers. In this embodiment, the damping force family of characteristics 1 is preferably realized by a bypass channel 63 in a pressure tube 65 for the first damping force family of characteristics 7, together with one hydraulic-mechanical stop each for decompression and compression.

In FIG. 10, the shock absorber 11 is shown in the normal stroke position 9 (see FIG. 6). The length of the bypass channel 63 is preferably longer than the effective compression length on the piston 67 by an amount corresponding to the stroke length of the damping force family of characteristics 7. In each stroke direction, there is preferably a compression and decompression stop respectively in the form of a slotted ring 69 inside a control sleeve 71. The ring 69 is preferably under a radial prestress in relation to the pressure tube 65, so that a friction force can be created. If the piston 67 leaves the damping force family of characteristics 7 in any direction, then a stop 73 (see FIG. 11) on the piston rod 43 or a stop surface 75 (see FIG. 11) on the piston 67 preferably displaces the ring 69. As a result of this displacement of ring 69, a radially narrowing bypass channel 63 is partly closed as a function of the stroke, and a progressive damping force can thus be exerted.

Figure 11:
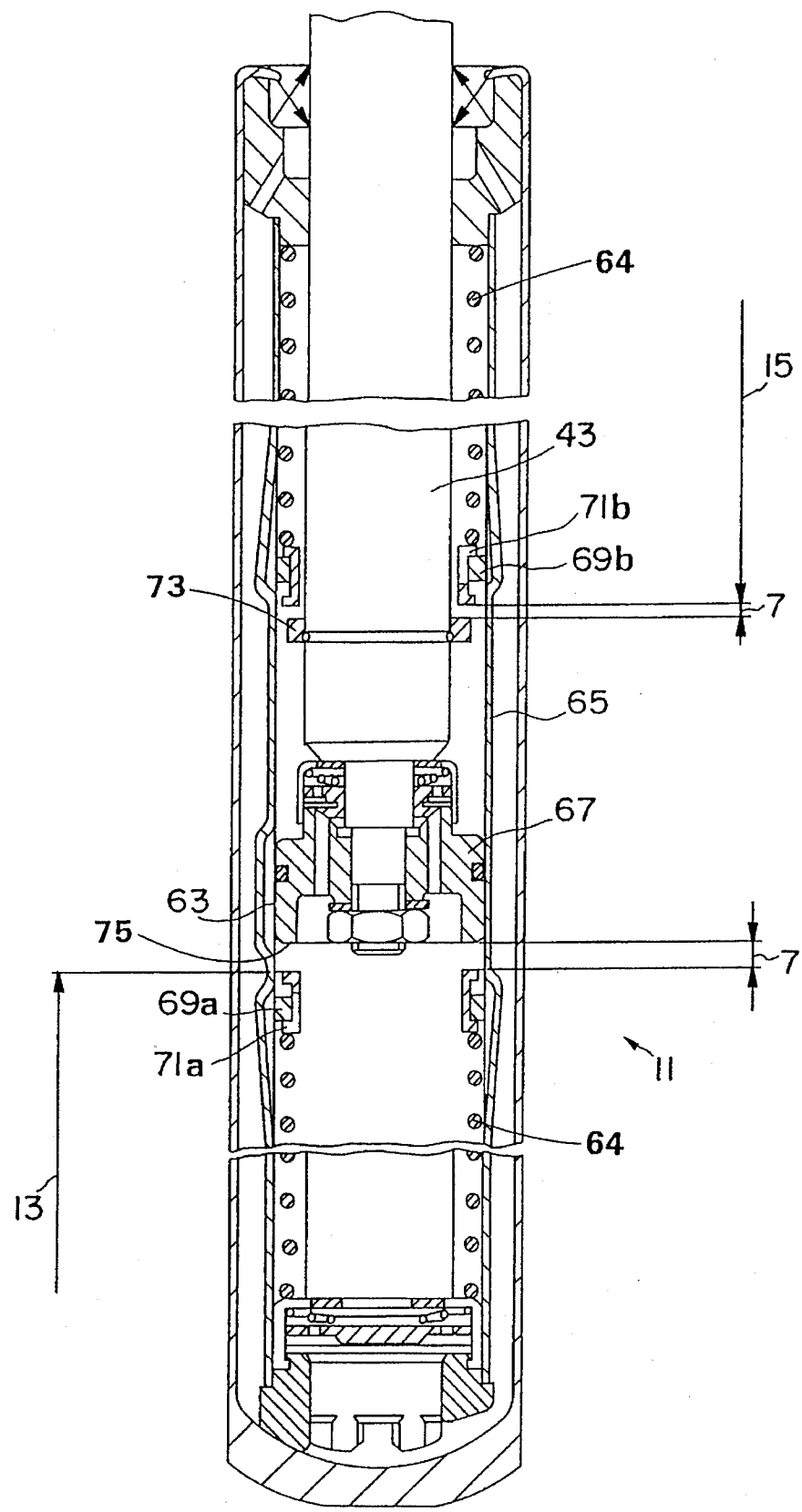
FIG. 11 is substantially the same view as FIG. 10, but more detailed.

Thus, as illustrated in FIGS. 10 and 11, in accordance with a preferred embodiment of the present invention, the damping force family of characteristics 7 may preferably be in effect when the stroke is such that neither control sleeve 71a or 71b is contacted, respectively by stop surface 75 or stop 73. Preferably, when the stroke is such that stop surface 75 contacts control sleeve 71a, ring 69a, preferably because of radial prestress, will essentially be displaced radially outwardly in such a way as to constrict the width of bypass channel 63 and thus reduce the flow of damping medium as a function of stroke to achieve the damping force family of characteristics 13. Likewise, when the stroke is such that stop 73 contacts control sleeve 71b, ring 69b, preferably because of radial prestress, will essentially be displaced radially outwardly in such a way as to constrict the width of bypass channel 63, and thus reduce-the flow of damping medium as a function of stroke to achieve the damping force family of characteristics 15. In the axial direction of shock absorber 11, both rings 69a and 69b are preferably supported by corresponding springs 64.

Figure 12:
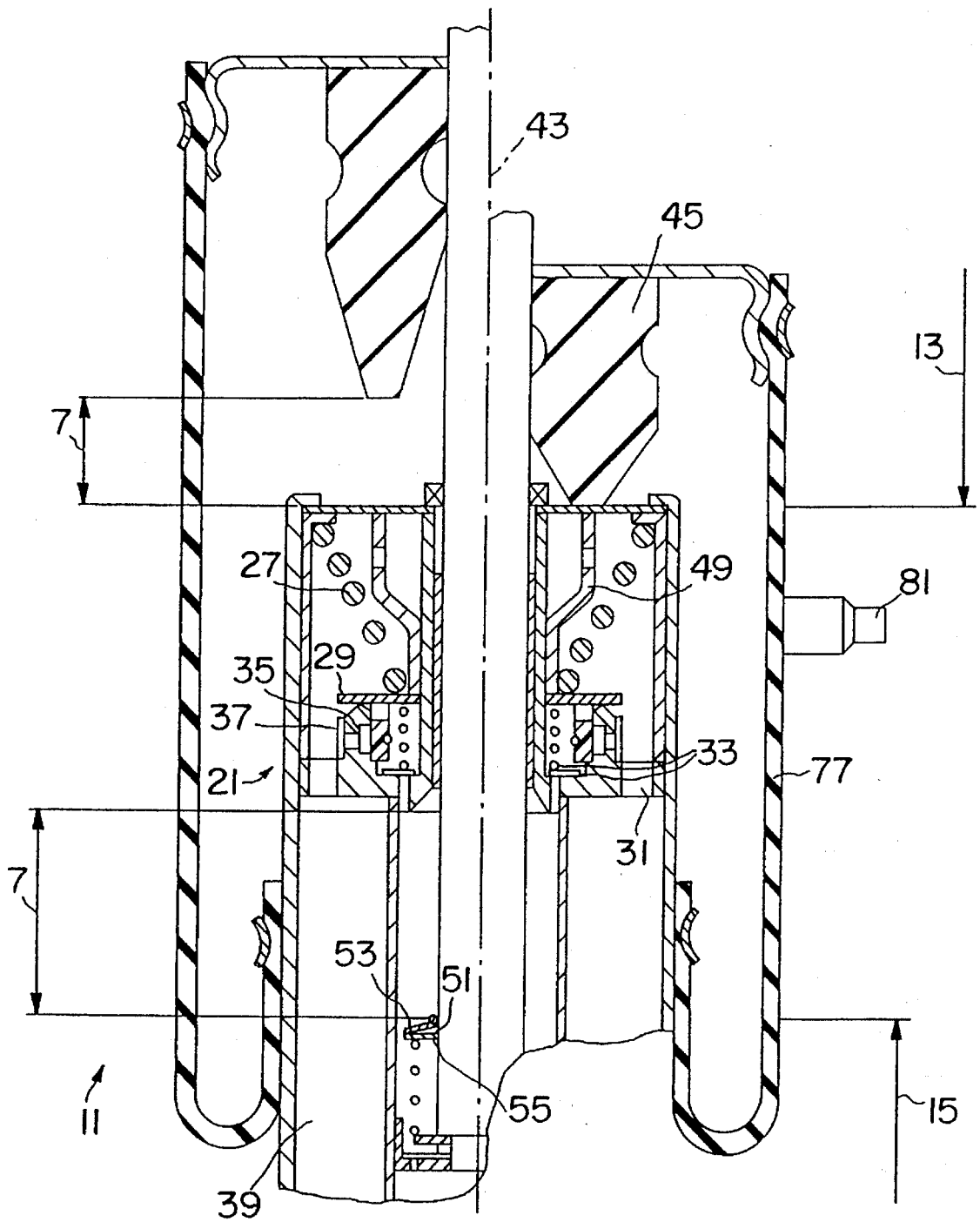
FIG. 12 illustrates a pneumatic spring.

In accordance with another preferred embodiment of the present invention, FIG. 12 shows a shock absorber 11 with load-independent damping. On the shock absorber, there may preferably be a pneumatic spring with a level control system as a vehicle suspension spring. The basic structure may preferably be essentially the same as illustrated in FIG. 8, with the distinction that a pneumatic spring designed as an expansion bellows 77 can preferably be used as the vehicle suspension spring.

The load-independent operation within the damping force family of characteristics 7 of the shock absorber 11 is preferably based on a process whereby the air pressure inside the expansion bellows 77 pressurizes what may be a membrane 79 (see FIG. 13), which membrane is preferably sealed off from the equalization chamber 39 and is rigidly braced on the inside and outside diameter, independently of the valve disc 29.

The very degressive damping force of the damping device 21 is preferably determined by the conical coil spring 27, and, within the first damping force family of characteristics 7, preferably no additional forces are exerted on the valve disc 29. Only after the transition between the first damping force family of characteristics 7 and the damping force family of characteristics 13, does a pressure pad 45 preferably come in contact with the membrane 79, which preferably acts via a control sleeve 49 to transmit the force to the valve disc 29, so that the rest of the stroke in the insertion direction of the piston rod 43 results in a sharply progressive damping force characteristic. There is preferably a pneumatic connection 81 on the expansion bellows 77 to regulate the level.

Figure 13:
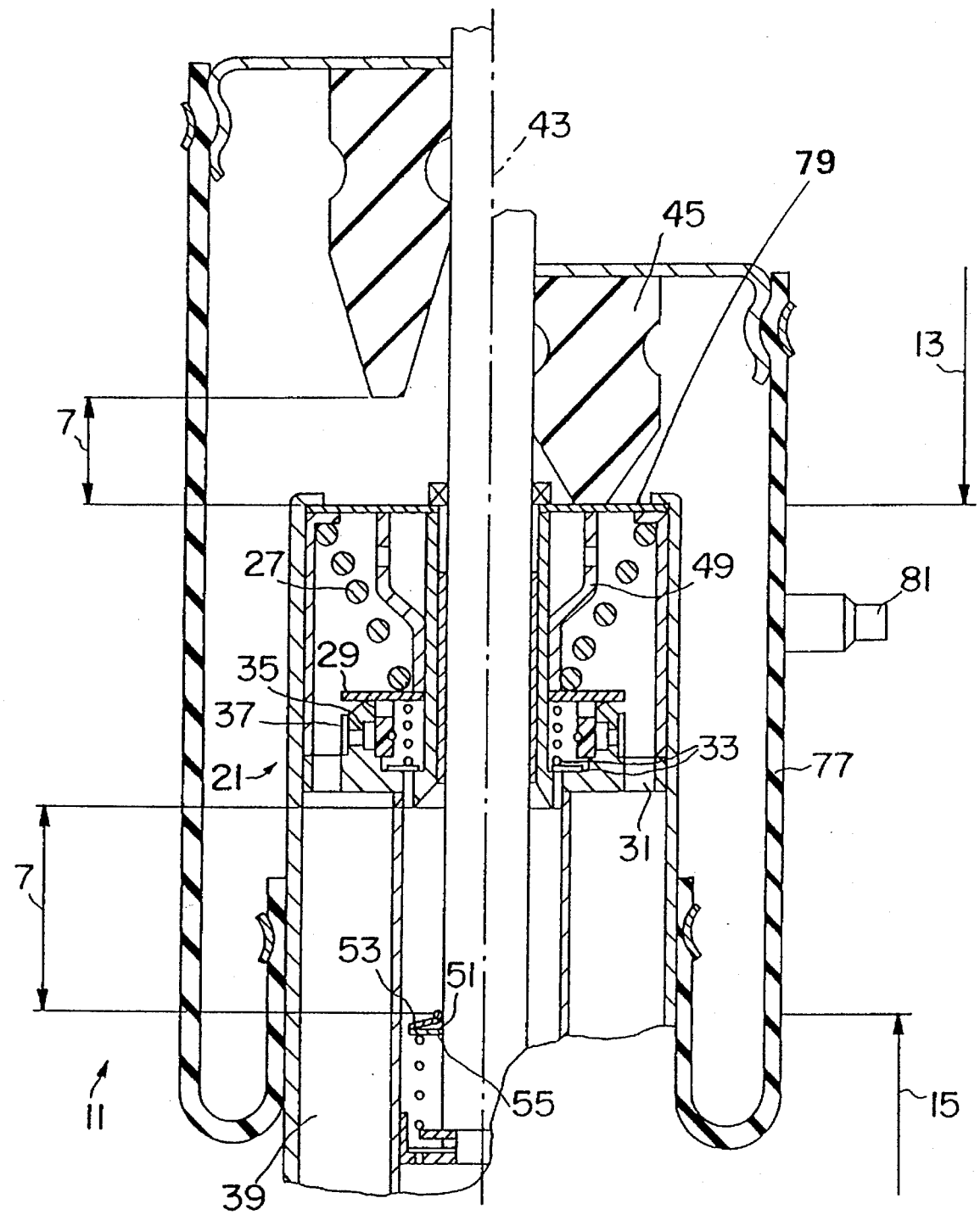
FIG. 13 is substantially the same view as FIG. 12, but more detailed.

Thus, as illustrated in FIGS. 12 and 13, in accordance with a preferred embodiment of the present invention, pneumatic connection 81 is preferably provided to regulate the level of air pressure within the bellows 77. Preferably, the damping force family of characteristics takes place via spring 27, similarly to the arrangement shown in FIGS. 8 and 9. Additionally, damping force families of characteristics 13 and 15 also take place in a manner similar to that described with reference to FIGS. 8 and 9.

It will be appreciated that, in each of the arrangements described above with reference to FIGS. 8, 9, 10, 11, 12 and 13, the various parameters relating directly to the damping force families of characteristics 7, 13 and 15, such as spring constants, passage diameters, deflection ratios and the like, are preferably configured in such a way as to substantially optimally produce a desired damping force family of characteristics 1, with desired values, and generally has the shape shown in FIGS. 6 and 7.

Figure 14:
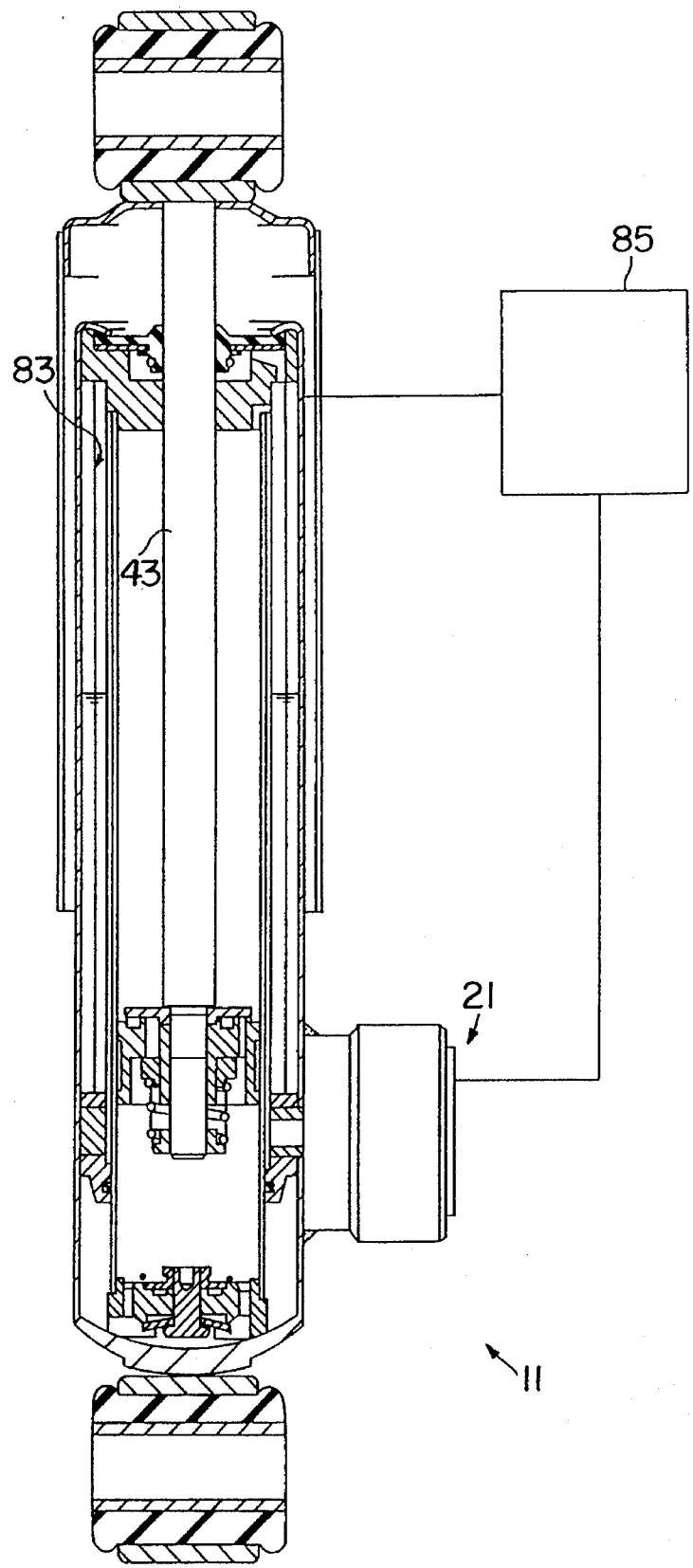
FIG. 14 illustrates a shock absorber with a continuously adjustable damping force.

FIG. 14 shows a shock absorber 11 with a damping force which can be adjusted by means of a damping device 21 connected in parallel. The basic structure of shock absorber 11 may preferably be the same as that of other known shock absorbers, so that the description hereinbelow has been restricted to its essential features.

The shock absorber 11 may preferably be equipped with a position detection device 83 which can preferably sense the stroke length of the shock absorber 11. The signal generated by the position detection device 83 is transmitted to a computer 85 which has, among other things, the damping force family of characteristics 1 stored in its memory. A normal position 9 of the shock absorber 11 can preferably be determined by means of the position detection device 83. For example, after the vehicle ignition is turned on, the signal from the position detection device 83 could be defined as the reference signal. The position of the first damping force family of characteristics 7 is thus clearly and very easily determined.

The stroke length for the first damping force family of characteristics 7 is also preferably stored in the computer's memory. If a signal is transmitted to the computer by the position detection device 83 which corresponds to a stroke position outside the first damping force family of characteristics 7, then there is preferably a continuous transition from the softening damping force setting, independent of the stroke direction, to a harder damping force setting of the damping device 21. The desired progressive damping force curve within the harder damping force setting can be very easily realized by continuously sensing the stroke position, and by hardening the damping force setting as the shock absorber approaches its limit positions.

It should be understood that the arrangement illustrated in FIG. 14 could conceivably be utilized in accordance with other embodiments of the present invention. In this respect, it is conceivable, for example, to use the arrangement of FIG. 14 as a supplement to other embodiments of the present invention, wherein damping device 21 would conceivably provide additional damping, or to use the arrangement of FIG. 14 as the sole means for determining one or more of the damping force families of characteristics 7, 13 and 15. In the latter example, the arrangement of FIG. 14 could be used, for example, to provide the damping force families of characteristics 13 and 15, while mechanical arrangements found in other embodiments of the present invention could essentially provide the damping force family of characteristics 7.

Figure 15:
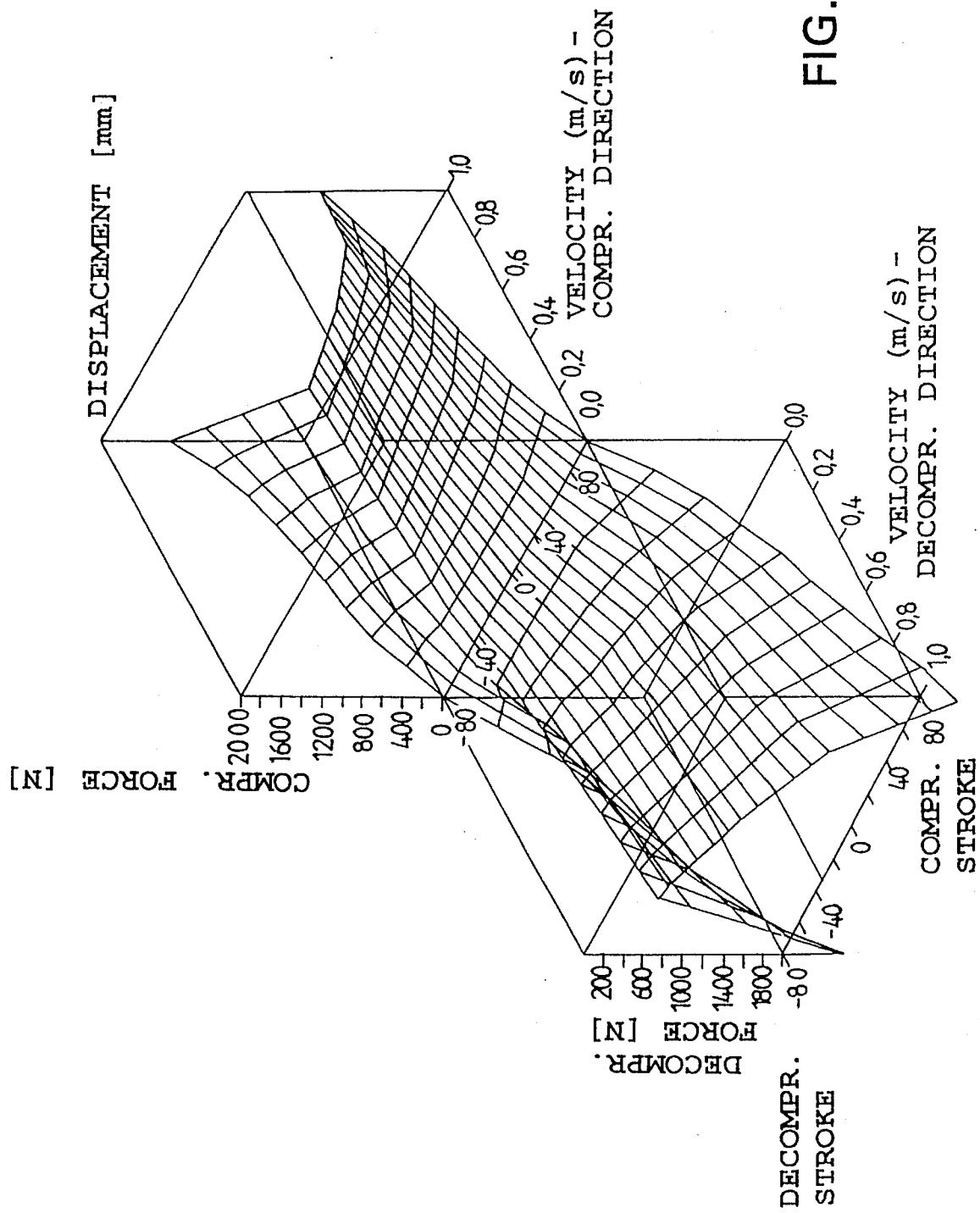

FIG. 15 is a three-dimensional performance-related graph illustrating a damping force family of characteristics 1 in accordance with the present invention. In FIG. 15, axes for displacement, velocity, and damping force are shown.

Figure 16:
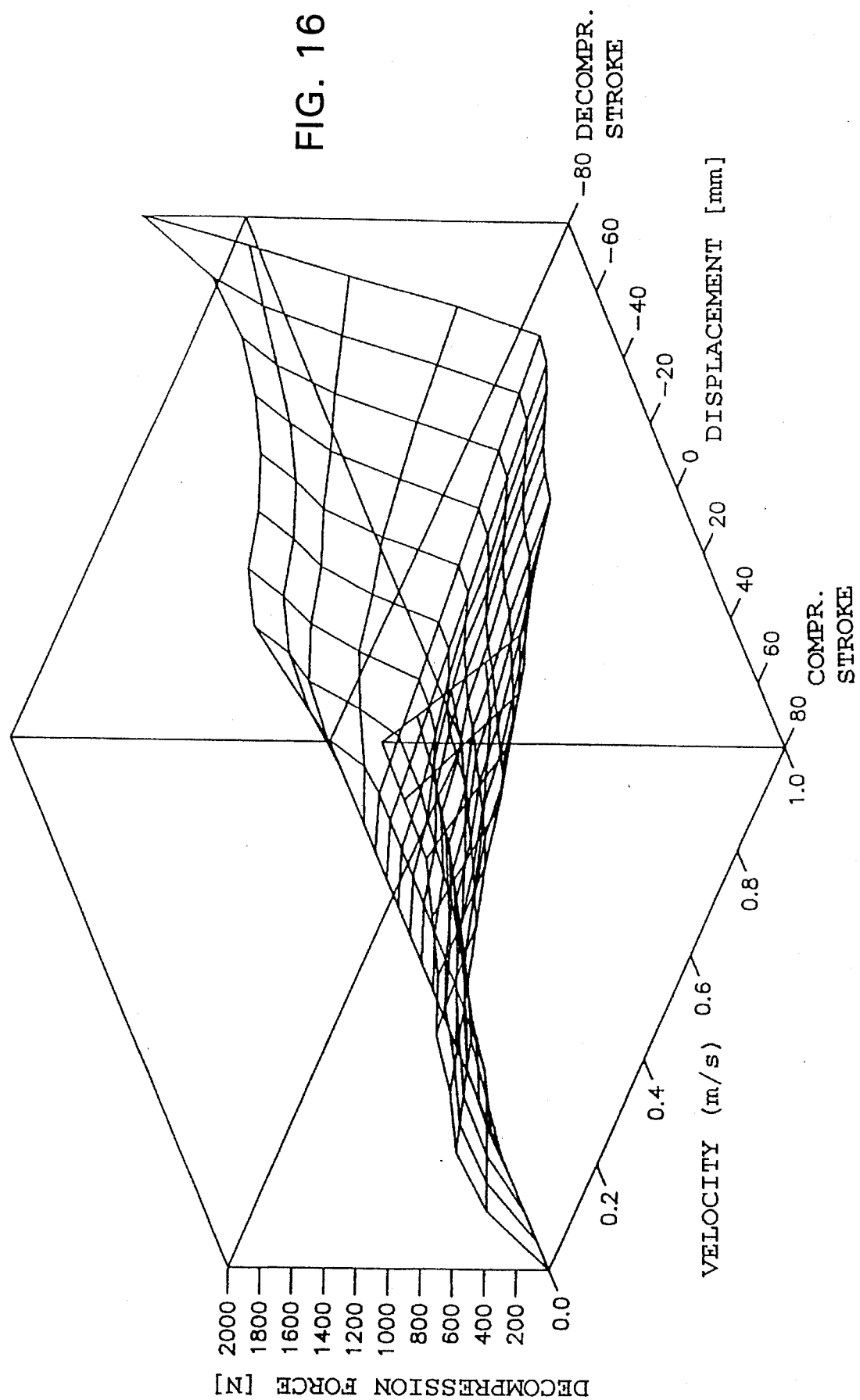

FIG. 16 represents, in three dimensions, that portion of the graph of FIG. 15 corresponding to the presence of a decompressive force.

Figure 17:
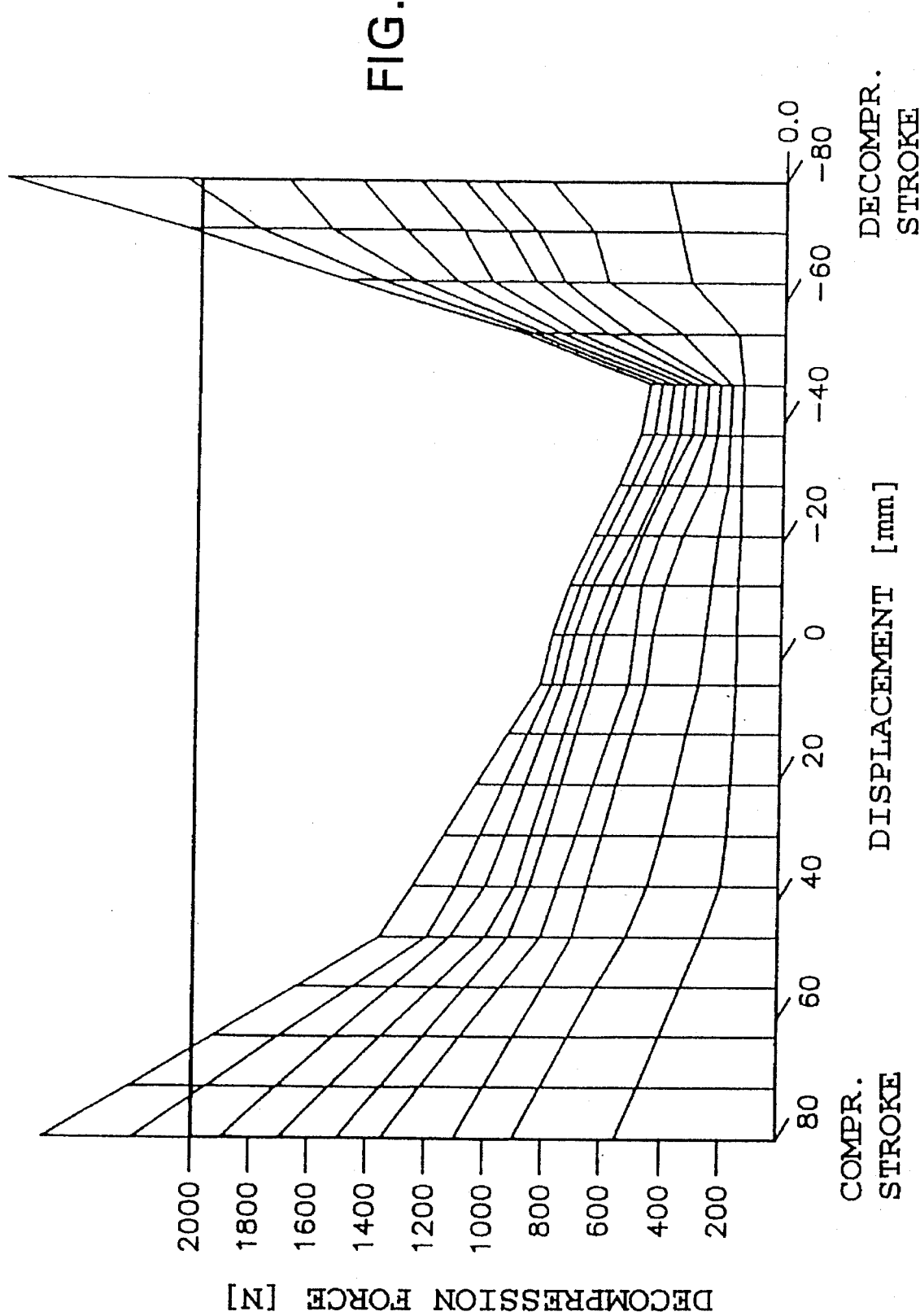

FIG. 17 is a two-dimensional representation of a portion of FIG. 16, showing displacement versus decompression force.

Figure 18:
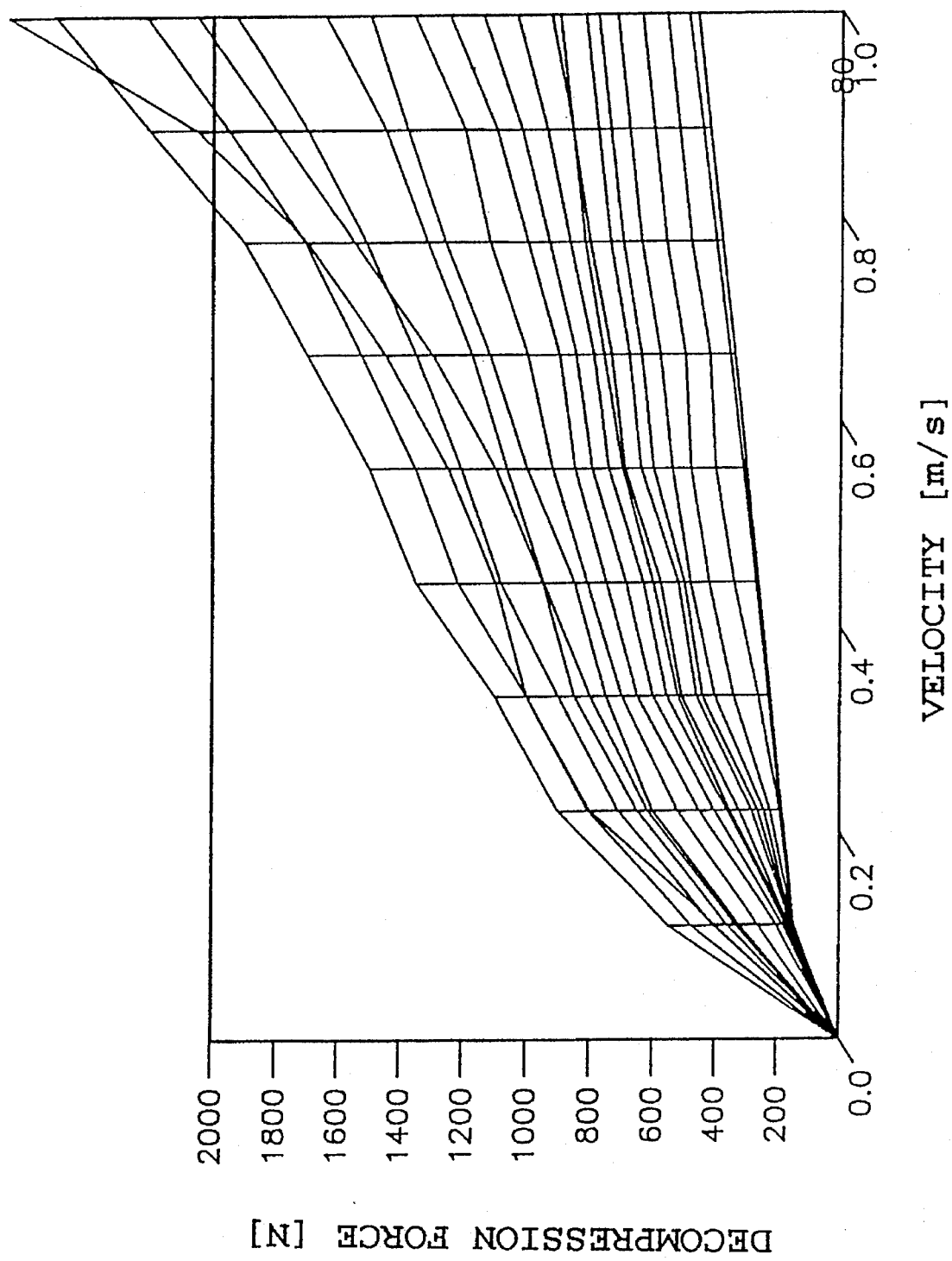

FIG. 18 is also a two-dimensional representation of a portion of FIG. 16, but showing velocity versus decompression force.

Figure 19:
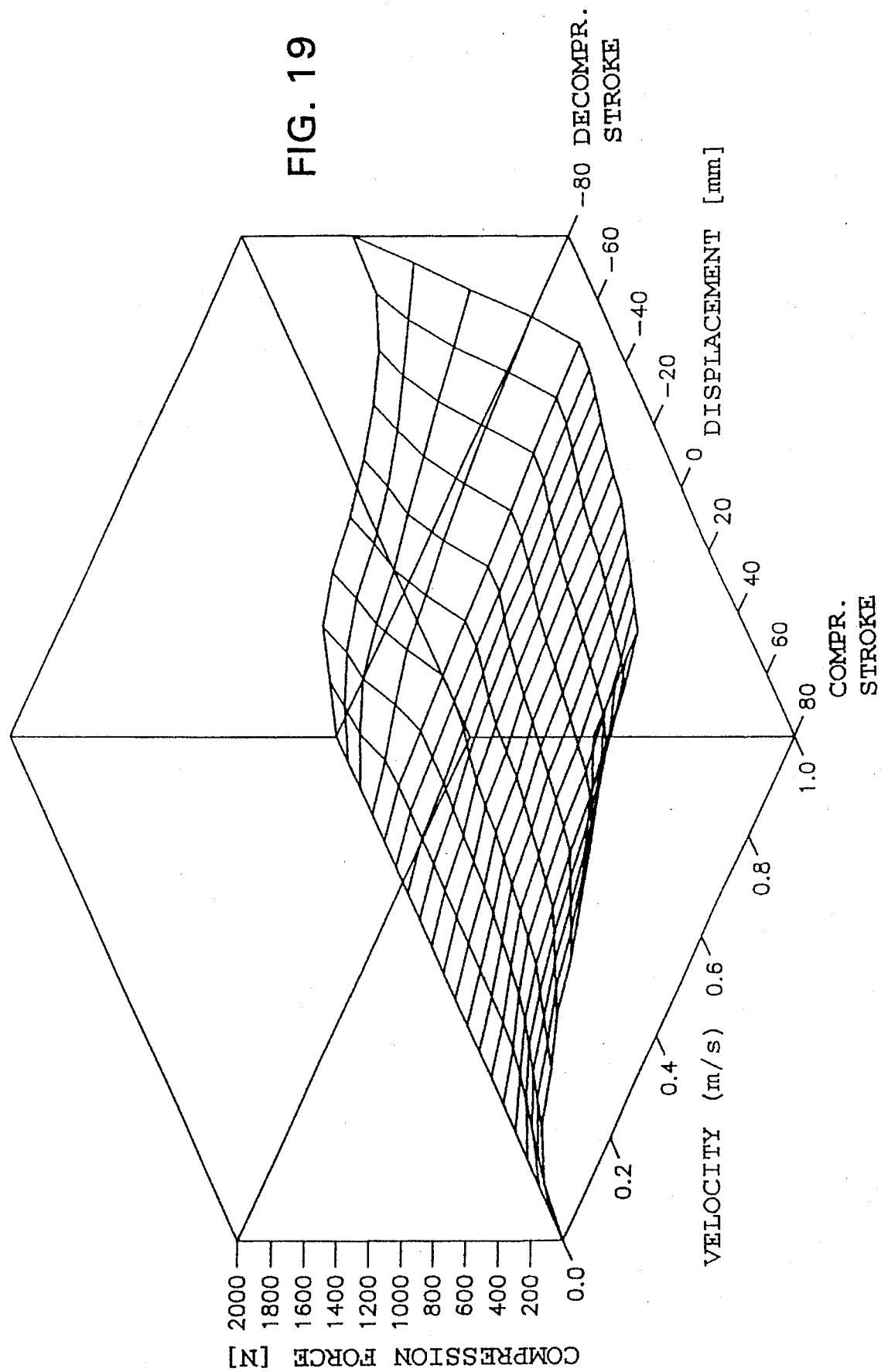

FIG. 19 represents, in three dimensions, that portion of the graph of FIG. 15 corresponding to the presence of a compressive force.

Figure 20:
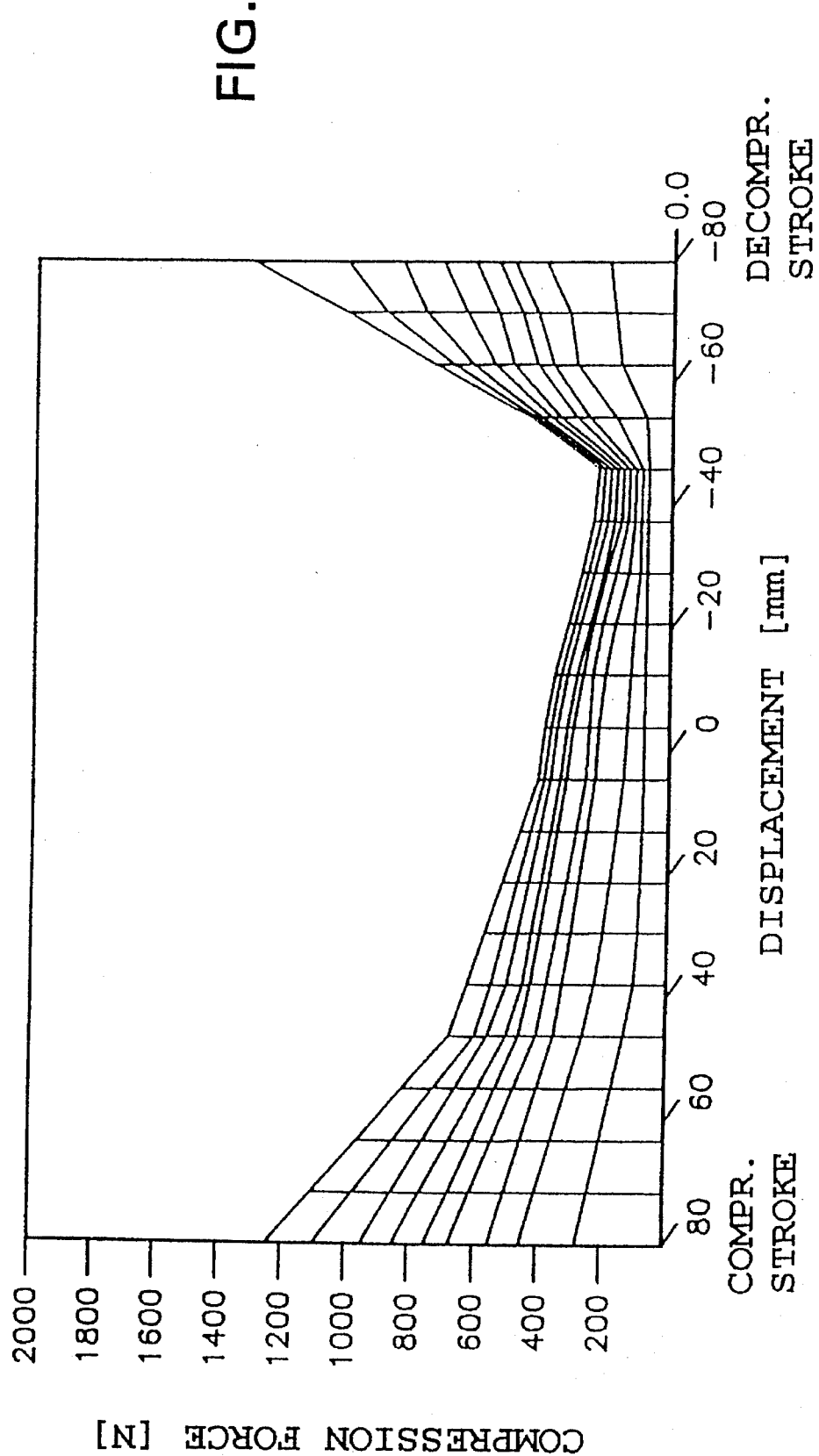

FIG. 20 is a two-dimensional representation of a portion of FIG. 19, showing displacement versus compression force.

FIGS. 21-36 illustrate alternative embodiments of the present invention.

Figure 21:
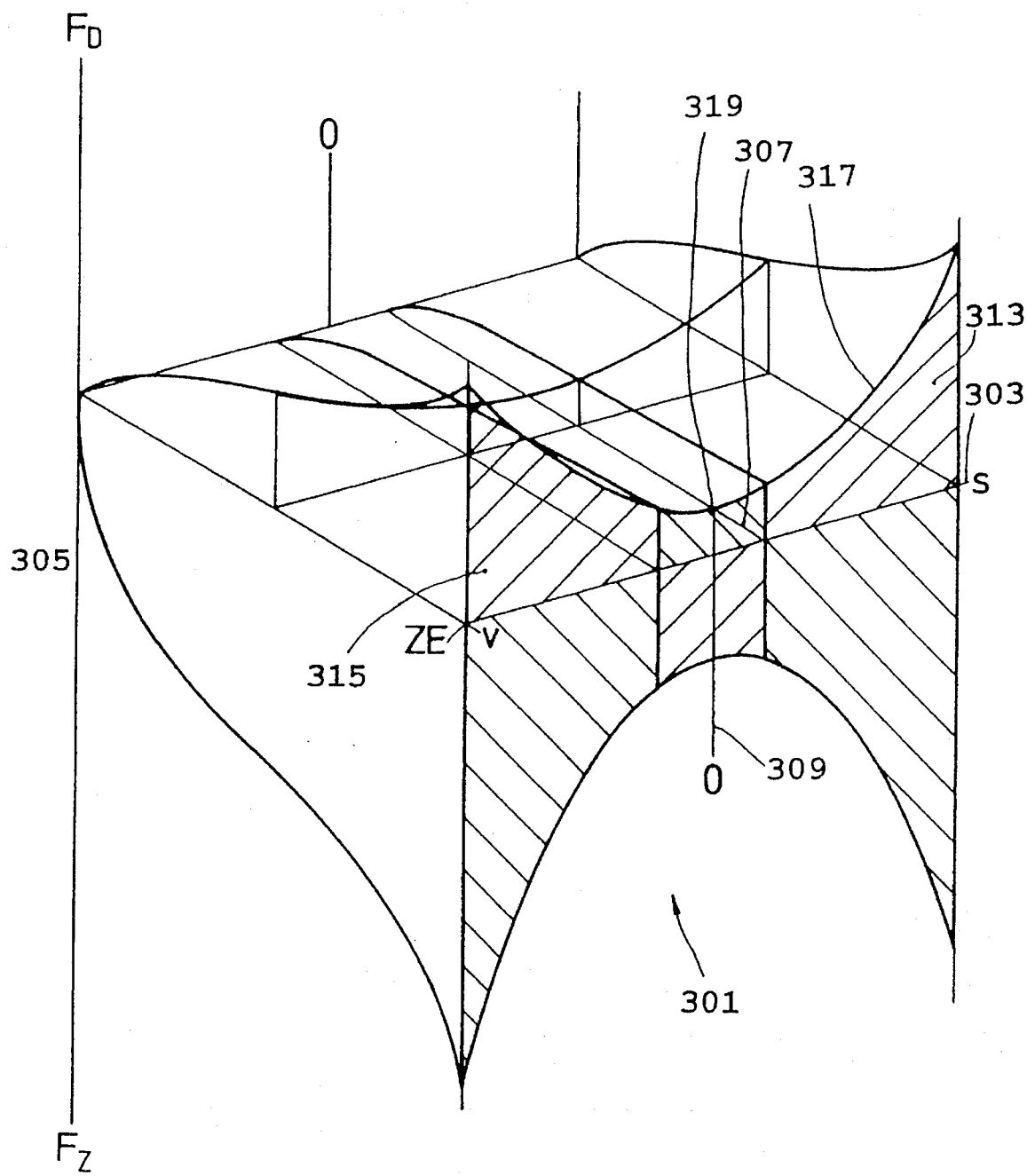

FIG. 21 shows a damping force family of characteristics 301, which is plotted as a function of the stroke (s-axis) 303 and velocity (v-axis). In terms of the stroke, the damping force family of characteristics 301 is divided into at least 3 individual damping force families of characteristics. A first damping force family of characteristics 307 lies in the range of the normal stroke position 309 of a shock absorber 311. The maximum stroke range of the first damping force family of characteristics 307 is restricted to approximately the spring deflection which is transmitted by one tire to the shock absorber, when the car is travelling over a manhole cover or cobblestone streets. The minimum stroke range is approximately on the order of the roughness of the road. Adjacent to the first damping force family of characteristics are the damping force families of characteristics 313 and 315, which are employed when a larger spring deflection is required.

In relation to the velocity axis, the first damping force family of characteristics has a very degressive damping force characteristic, with a correspondingly low damping force peak at the maximum spring deflection velocity. The damping force families of characteristics have a damping force curve which, at relatively low velocities and/or in the vicinity of the first damping force family of characteristics, has a degressive damping force behavior, but one which, with increasing spring deflection velocity in the stroke range near the limit positions of the shock absorber, assumes a sharply progressive damping force behavior.

The damping force family of characteristics 301 can be realized particularly well in a level-controlled shock absorber, since the normal stroke position (309) of the shock absorber, regardless of the load status of the vehicle, can always be kept in the first damping force family of characteristics 307. Alternatively, of course, it is also possible to design the damping force family of characteristics 301 as a function of the load. The bottom 319 of the curve of the damping force characteristic 317 would be shifted in the decompression direction (ZE).

Figure 22:
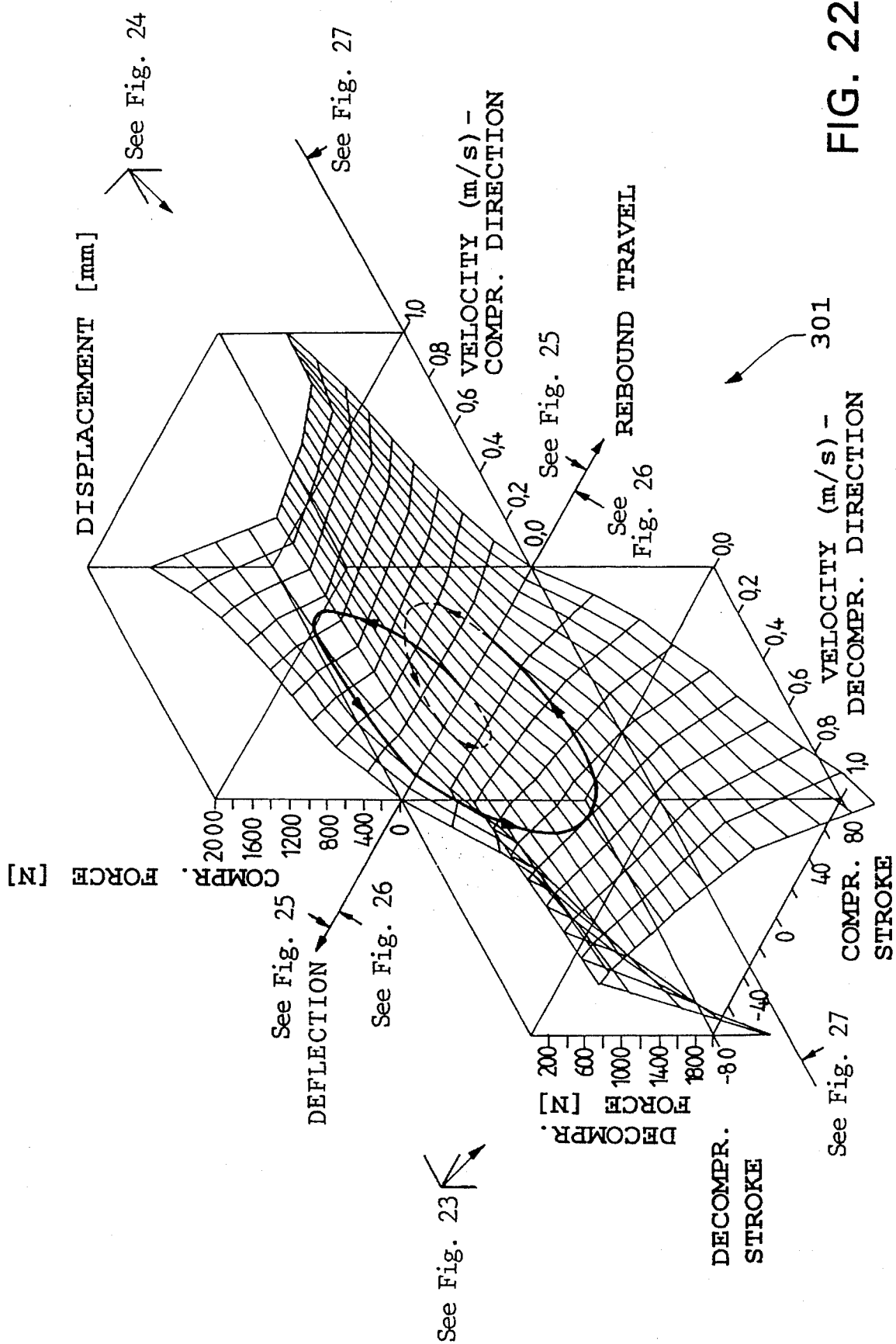
Figure 23:
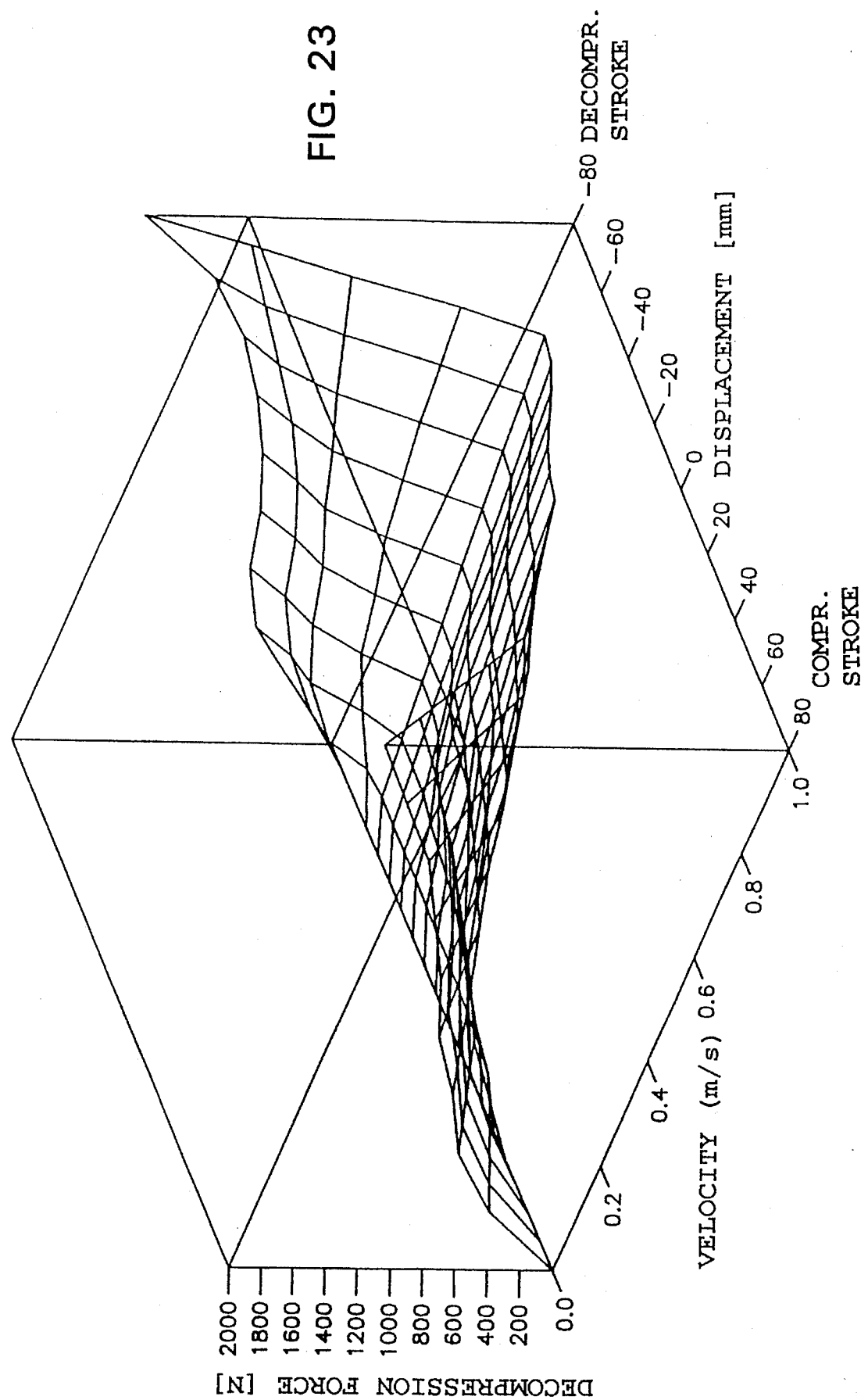
Figure 24:
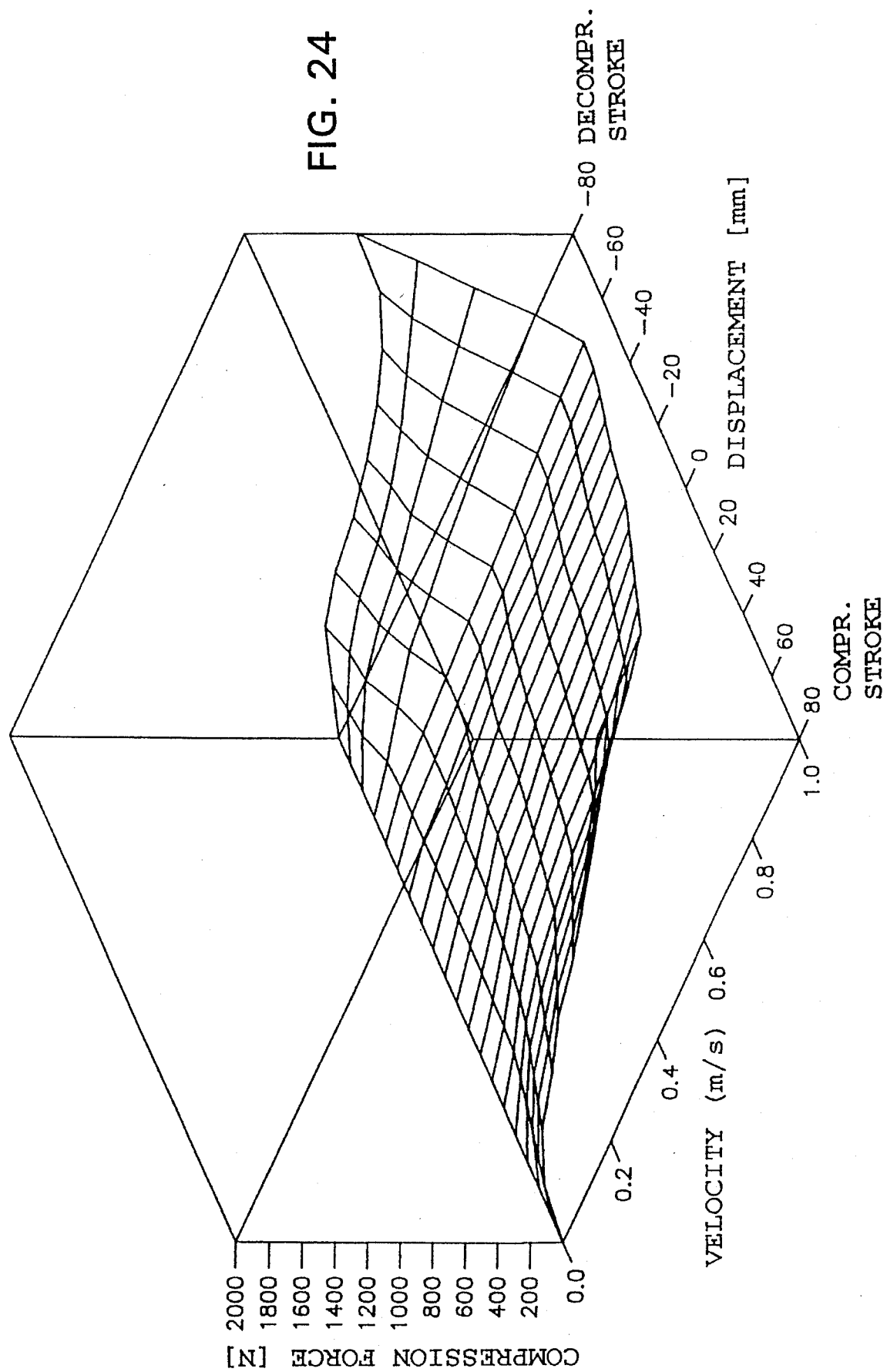
Figure 25:
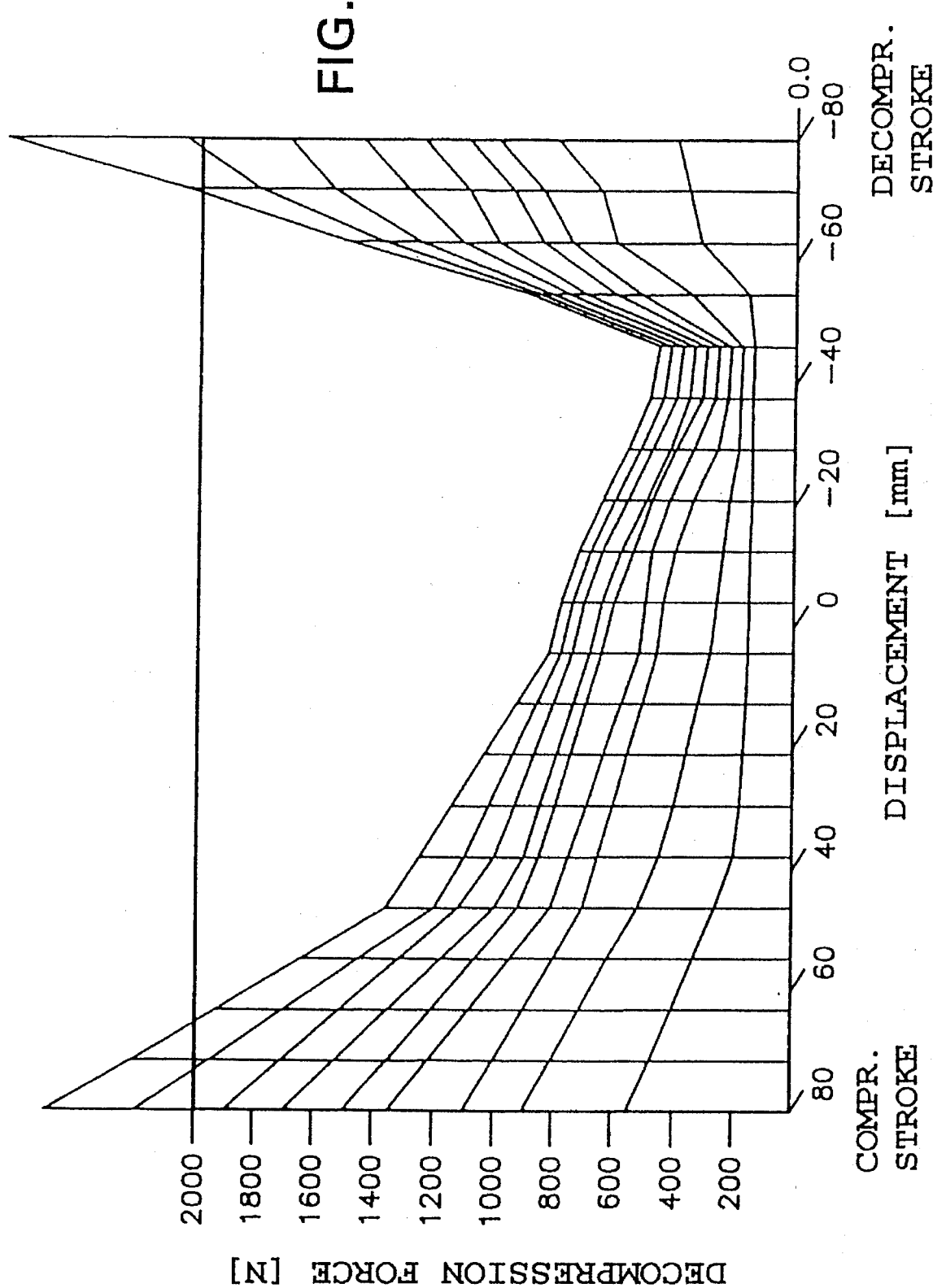
Figure 26:
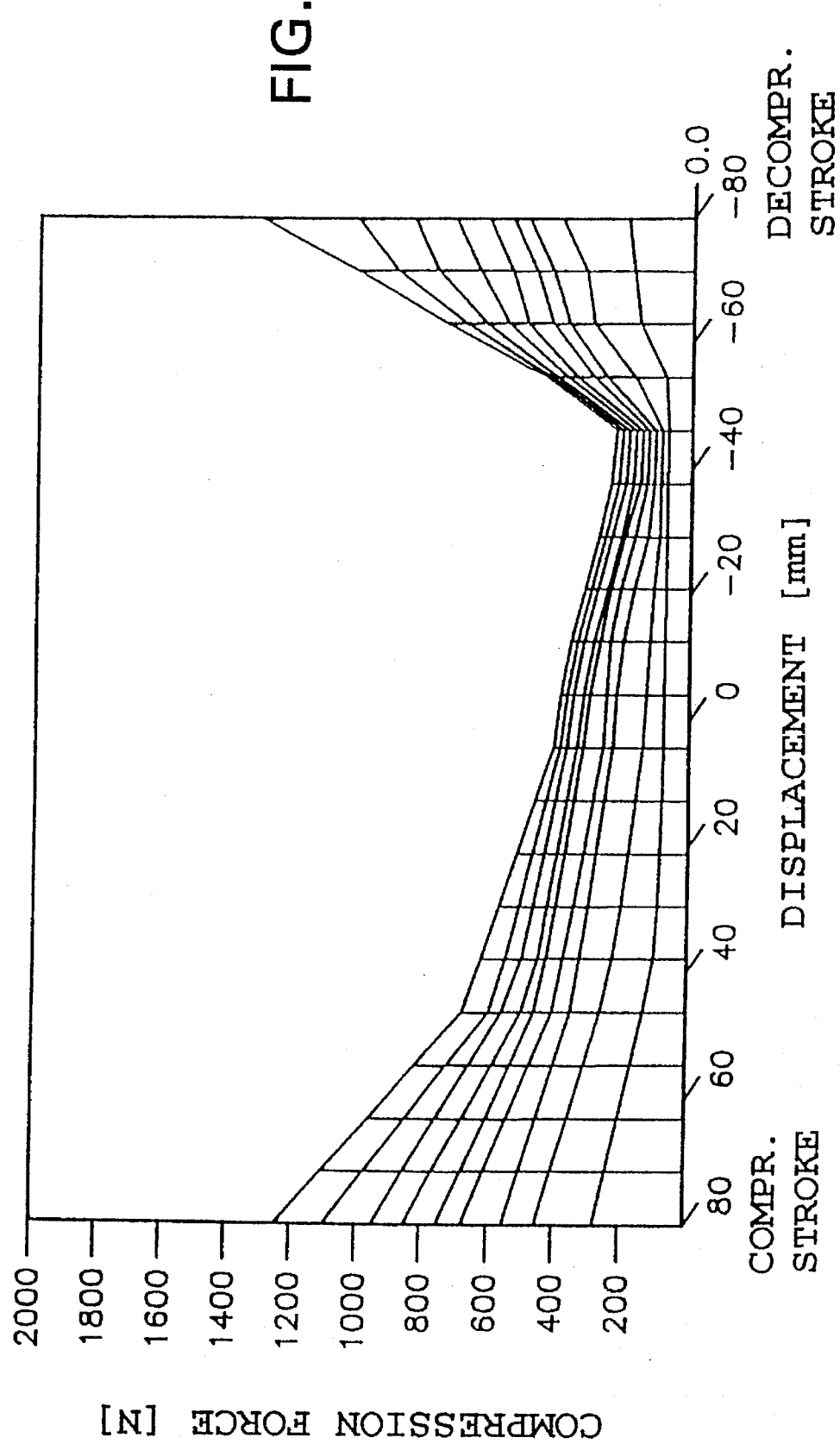

FIGS. 22 to 28 show the family of characteristics or projections of the family of characteristics 301. FIG. 22 shows clearly that only a small damping force is generated in the vicinity of the shock absorber distance 0 or of the normal position of the vehicle, which increases sharply toward the extreme stroke positions in the decompression direction and in the compression direction.

Figure 27:
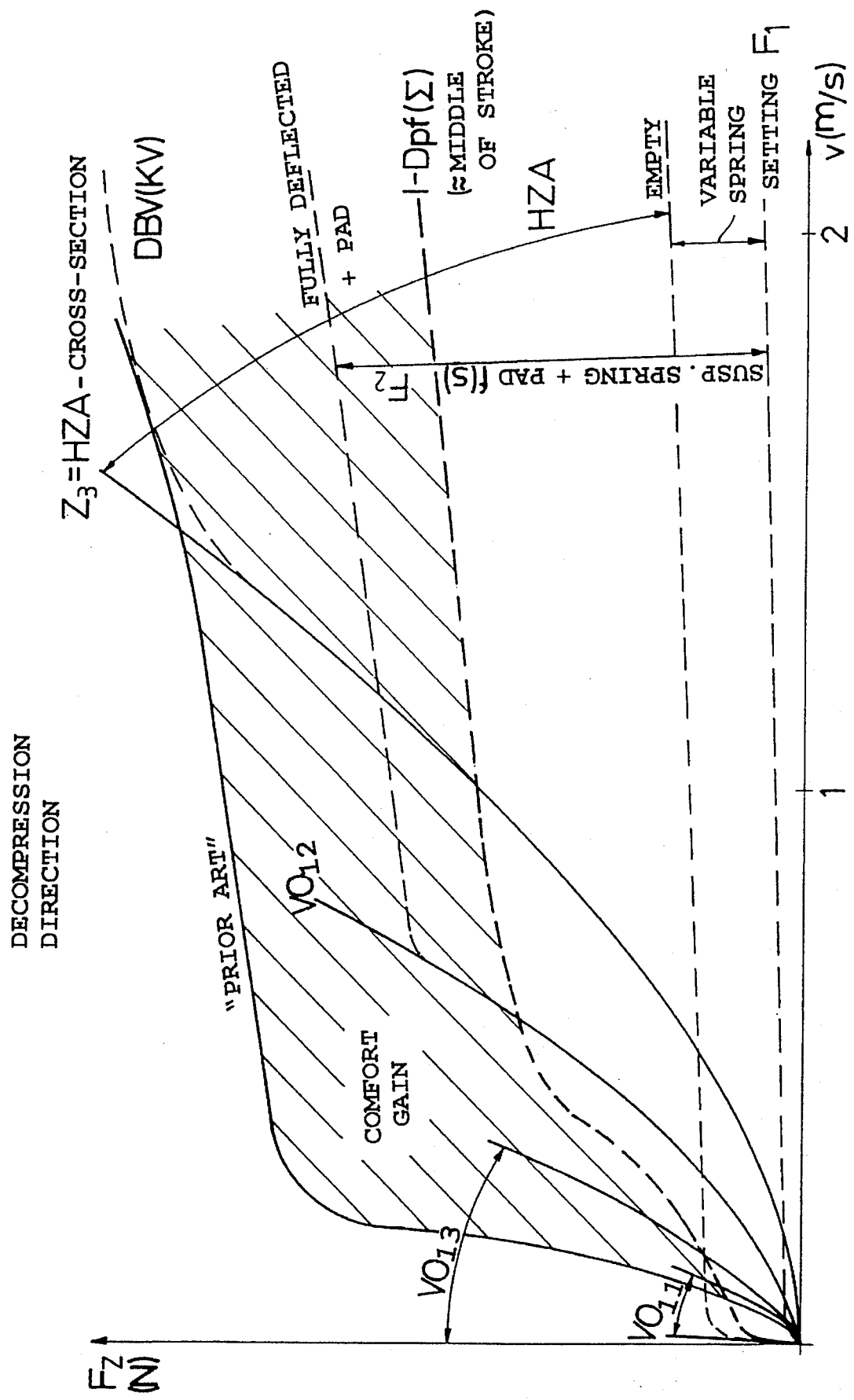

FIG. 27 shows a damping force velocity graph in the decompression direction of the family of characteristics. At a velocity of V0, there is predominantly an advance opening cross section $VO_{11}$, which is designed to prevent the rumbling of the shock absorber. Additively superimposed are advance opening cross sections $VO_{12}$ and $VO_{13}$. A spring force F1 of a valve $V_{11}$ limits the damping action of the advance opening cross section $VO_{11}$ above a specified velocity V, so that the advance opening cross sections $VO_{12}$ and $VO_{13}$ then primarily determine the damping force characteristic, until the maximum force F2 of a valve $V_{12}$ is reached. Then a hydraulic-mechanical decompression stop HZA is engaged, the action of which is controlled by a pressure relief valve DBV above a specified pressure level. The damping force characteristic indicated in broken lines stands for a medium load status of the vehicle. Compared to the solid line, which corresponds to the series condition under the same boundary conditions, the hatch-marked surface area represents the attainable gain in comfort for this load condition.

Figure 28:
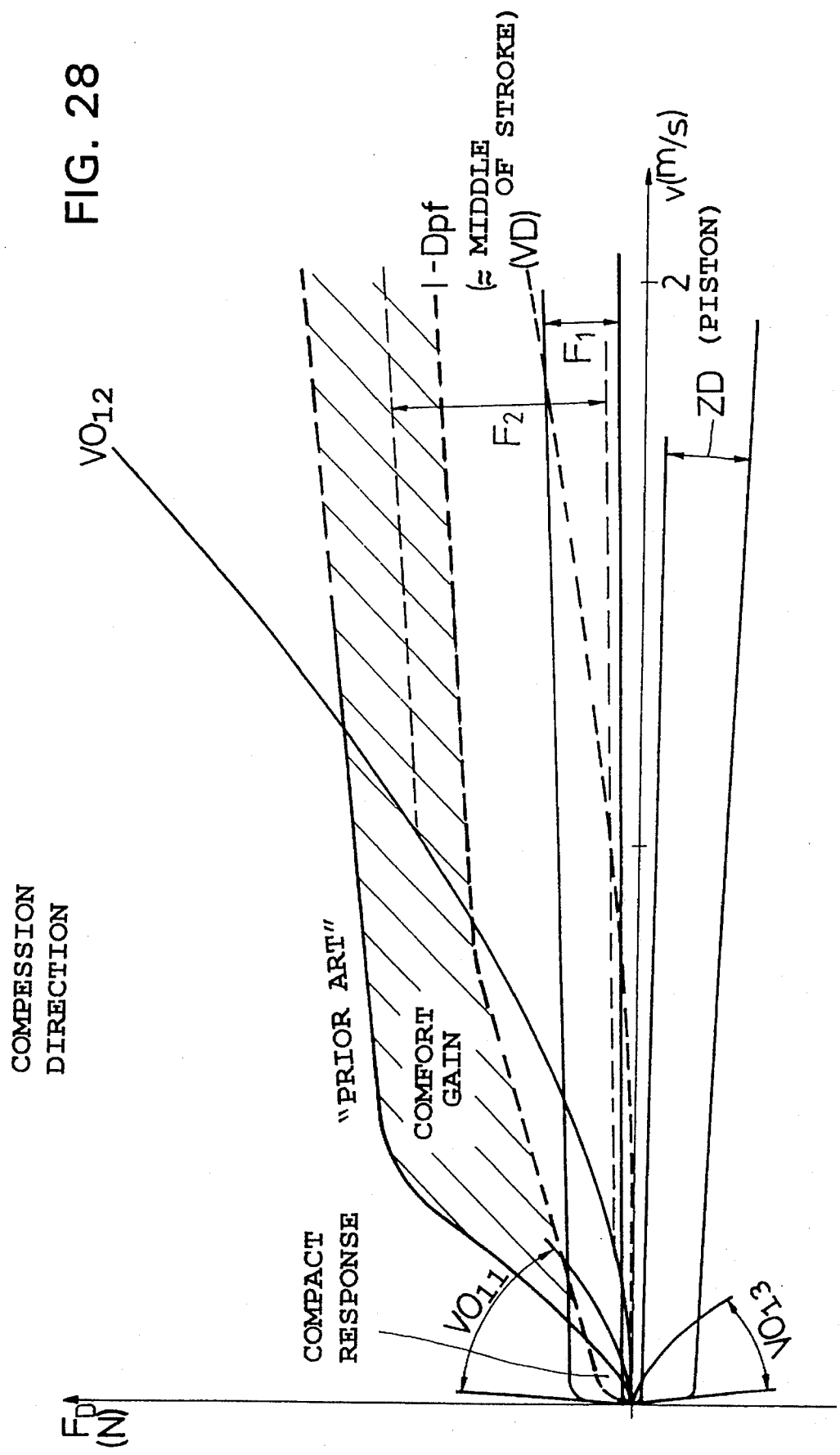

The corresponding portion of the description relating to FIG. 27 can also be applied to FIG. 28. In contrast to FIG. 27, however, it should be noted that no pressure relief valve counteracts a hydraulic pressure stop HDA. Moreover, the influence of the advance opening $VO_{13}$ and an additional damping force ZD is also apparent, which can be applied to adjust the decompression/compression ratio. The gain in comfort under the same boundary conditions is also shown.

Figure 29:
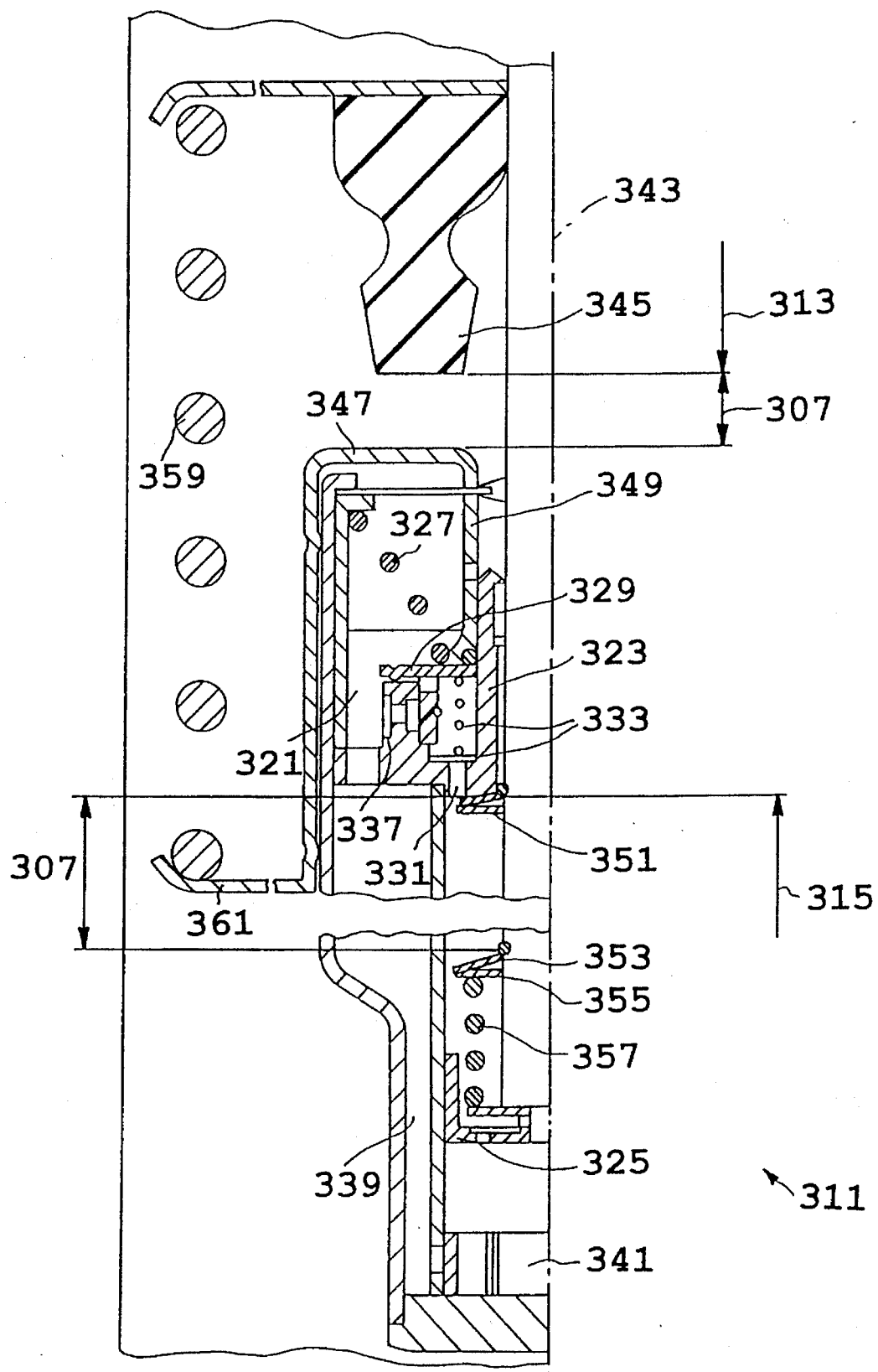

FIG. 29 shows one possible embodiment of a shock absorber 311, which realizes a damping force family of characteristics with a shifted bottom 319 of the curve. The damper is realized in the form of a spring strut, whereby there is a damping force device 321 in the upper end region of the shock absorber 311 inside a piston rod 323. The damping device 321 transmits the flow in only one direction, so that the same damping force can be exerted in the decompression and in the compression direction, since the piston valve 325 is designed as a non-return valve. The basic damping force of the valve $V_{12}$ is generated, among other things, by a very weak conical spring 327, corresponding to F2, which presses a valve disc 329 onto a valve seat. The displaced damping medium flows through the piston rod guide 323 through an inflow passage 331 (VD), which is equipped with a check valve 333 ($V_{11}$, F1, $VO_{11}$). A discharge passage 335, which also has a check valve 337, forms the connection to an equalization chamber 339. The equalization chamber is connected by means of a check valve 341 in the form of an elastic slotted ring ($VO_{12}$) to the working chamber.

When the spring is deflected, a piston rod 343 is inserted into the shock absorber 311. The damping medium flows through the damping device 321 and reaches the equalization chamber 339. Within the spring deflection in the insertion direction, between a compression pad 345 and a stop surface 347 of a control sleeve 349, starting from the deflection point at which a hydraulic-mechanical decompression stop 351 has just been tripped, the damping force family of characteristics 307 is located, and has a basic damping force which is defined by the conical coil spring 327. For the remainder of the spring deflection, the pressure pad 345 presses against the control sleeve 349 and thereby increases the pre-stress on the valve disc 329. This spring deflection is in the damping force family of characteristics 313. In the reverse deflection direction, when the hydraulic-mechanical decompression stop 351, consisting of a disc 355 braced between a spring plate 353 and a coil spring 357, together with the piston rod 34p has reached the inflow channel 331 on the piston rod guide 323, the damping force family of characteristics 315 begins, whereby the spring plate, by interacting with the disc 355, reduces the cross section of the inflow channel 331 and thus allows the damping force to increase.

The basic setting of the damping force generated by the conical coil spring 327 can be superimposed in an additive manner on a vehicle suspension spring 359 (F2), since the plate spring 361 transmits the spring force to the control sleeve 349. With this measure, the shock absorber can be load-controlled, and thus the position of the damping force characteristic trough 319 can be shifted in the decompression direction.

Figure 30:
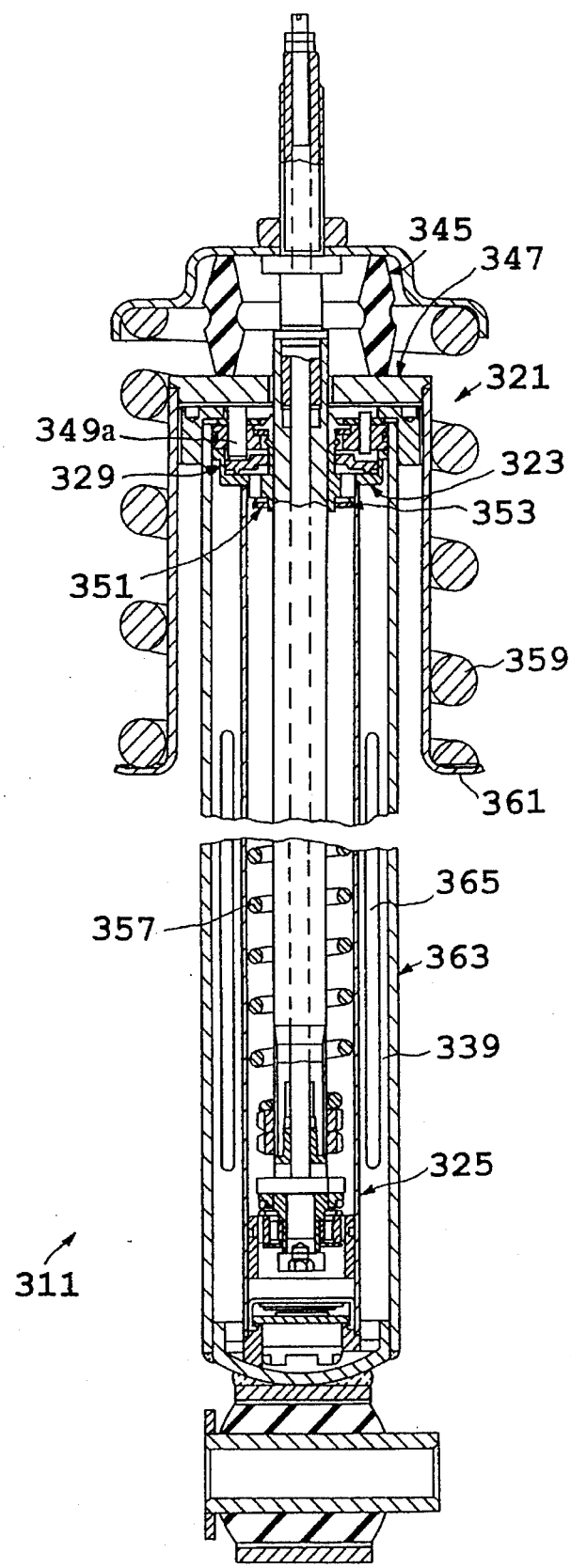

FIG. 30 shows a section through a shock absorber, the essential structure of which is the same as the model illustrated in FIG. 29. One difference is that a sealed cylinder 363 which is adjacent to the equalization chamber 339 is designed so that it has a constant cross section, and so that it occupies no more space than a corresponding standard shock absorber. Instead of a control sleeve 349, control pins 349a are used, which are actuated by the vehicle suspension spring 359 or the pressure pad 345 by means of the stop surfaces 347, whereby the valve function is influenced by the valve disc 329. So that the connection between the discharge passage and the equalization chamber 339 is always filled with damping medium, a gas pocket 365 is located inside the equalization chamber, so that no foaming effects can occur. Thus all the check valves in the piston rod guide can be eliminated.

The shock absorber 311 also has a hydraulic decompression stop (HZA) 351 corresponding to the description of FIG. 29. The hydraulic decompression stop is actuated by the coil spring 357. The spring length of the coil spring and the spring constants of the plate springs 353 and of the coil spring 357 can thereby be used to tune the application point of the hydraulic decompression stop. For example, if a rather soft plate spring is used, which has a lower spring constant than the coil spring 357, the hydraulic decompression stop acts first, before the mechanical stop is engaged by means of the coil spring.

Figure 31:
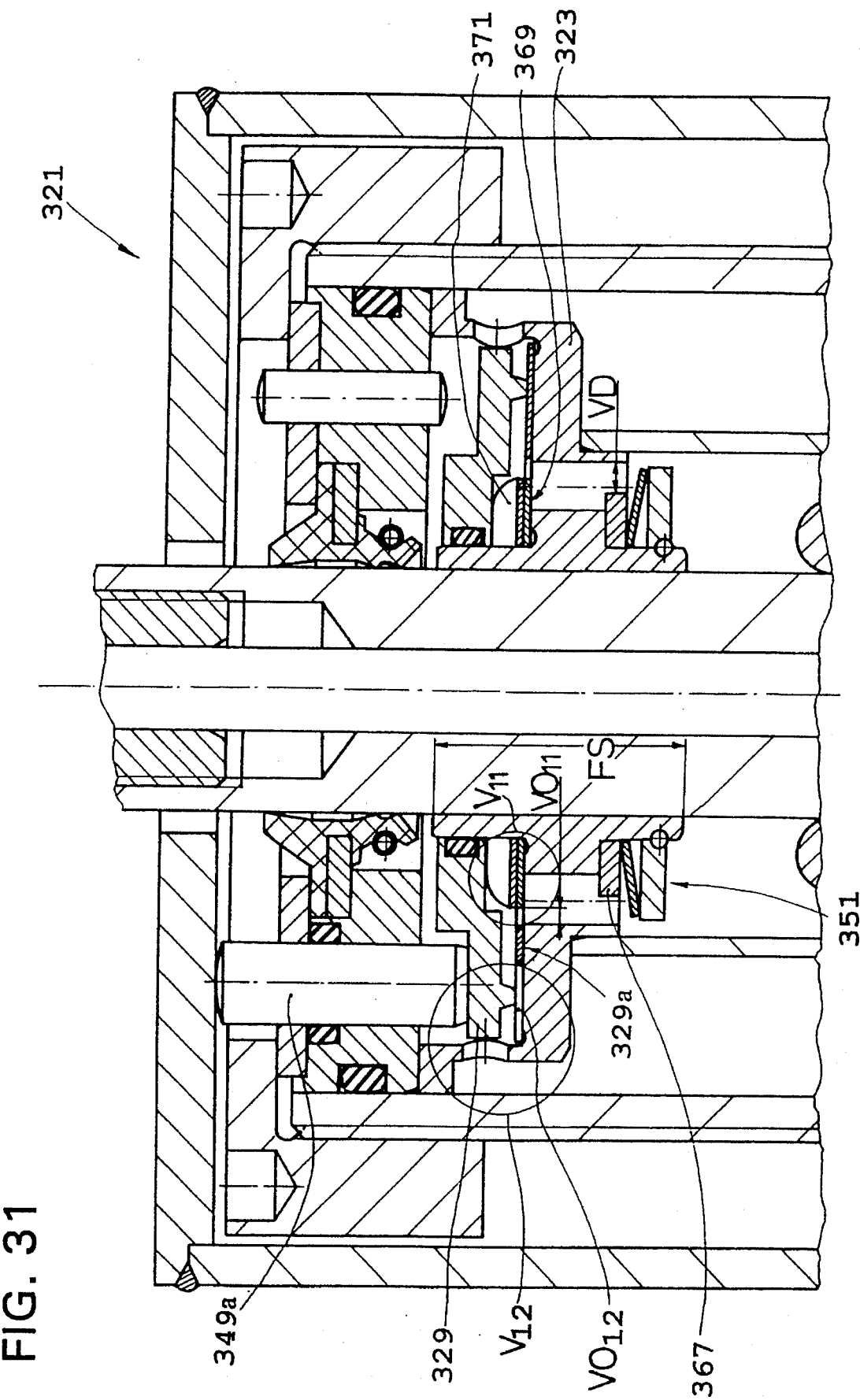

As shown in FIG. 31, there are a series of possibilities for the adaptation of the shock absorber to a specified vehicle. For example, when a standard piston rod guide is used, a pre-throttle VD can be realized by means of a pre-throttle disc 367. The pre-throttle cross section can be set by the selection of the outside diameter of the pre-throttle disc 367. The load-dependent valve $V_{12}$ can be designed as a function of the spring stiffness of the spring F2, i.e. of the vehicle suspension spring 359 (FIG. 30), as well as of a corresponding advance opening cross section $VO_{12}$. For the load-dependent damping valve, the damping force characteristic can be adapted to the requirements by means of the contact circle of the valve disc 329, as well as a slotted disc 329a which determines the advance opening cross section. The slot widths multiplied by the thickness of the slotted disc 329a thereby form the advance opening $VO_{12}$.

The advance opening cross section $VO_{11}$ is determined by an advance opening disc 369 separate from the slotted disc 329a, and which is prestressed by a valve spring 371. The advance opening disc 369 and the valve disc 371 form the load-independent valve $V_{11}$.

Figure 32:
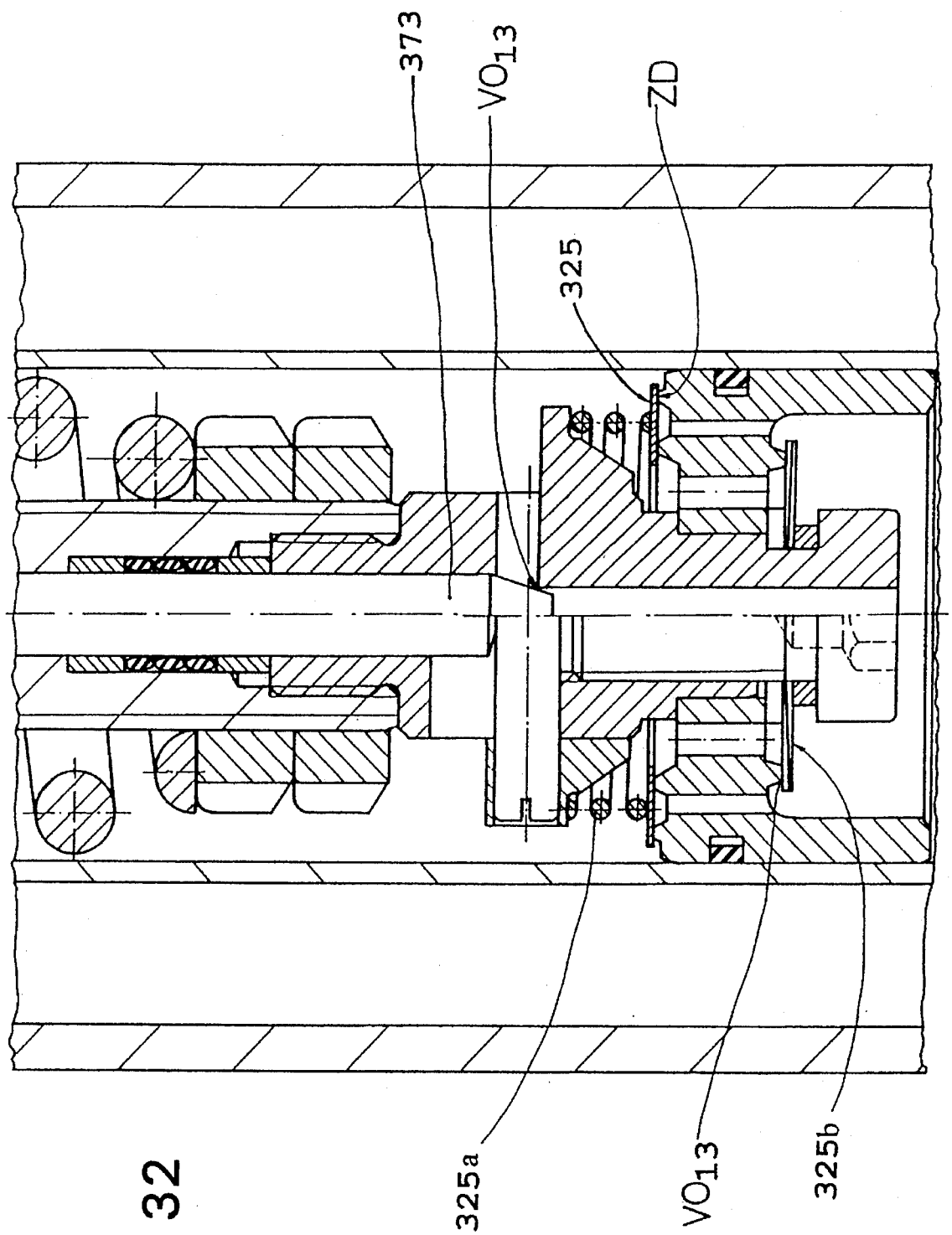

FIG. 32 illustrates the piston of the shock absorber 311. In the compression direction, a check valve 325 acts, which in this variant can be adjusted by means of a piston rod 373 in terms of its opening action. It is thereby possible that the check valve 325 can generate an additional damping force ZD in the compression direction by means of its closing spring 325a. Alternatively, as shown in the right half of the piston, a third advance opening cross section $VO_{13}$ can be influenced by the control rod 373, in contrast to which, on the left half of the piston, a constant advance opening $VO_{13}$ is executed in the context of a pressure relief valve DBV 325b, in which there is a slot in the valve seat or a valve disc provided with recesses inside the pressure relief valve. The pressure relief valve 325b consists of at least one valve disc which, above a specified pressure level, opens a connection between the working chamber on the piston rod side and the working chamber away from the piston rod. The pressure relief valve 325b thereby trims the damping action of the hydraulic decompression stop. The advance opening $VO_{13}$ is used, among other things, to influence the adaptation of the decompression and compression damping on specified shock absorber sizes.

Figure 33:
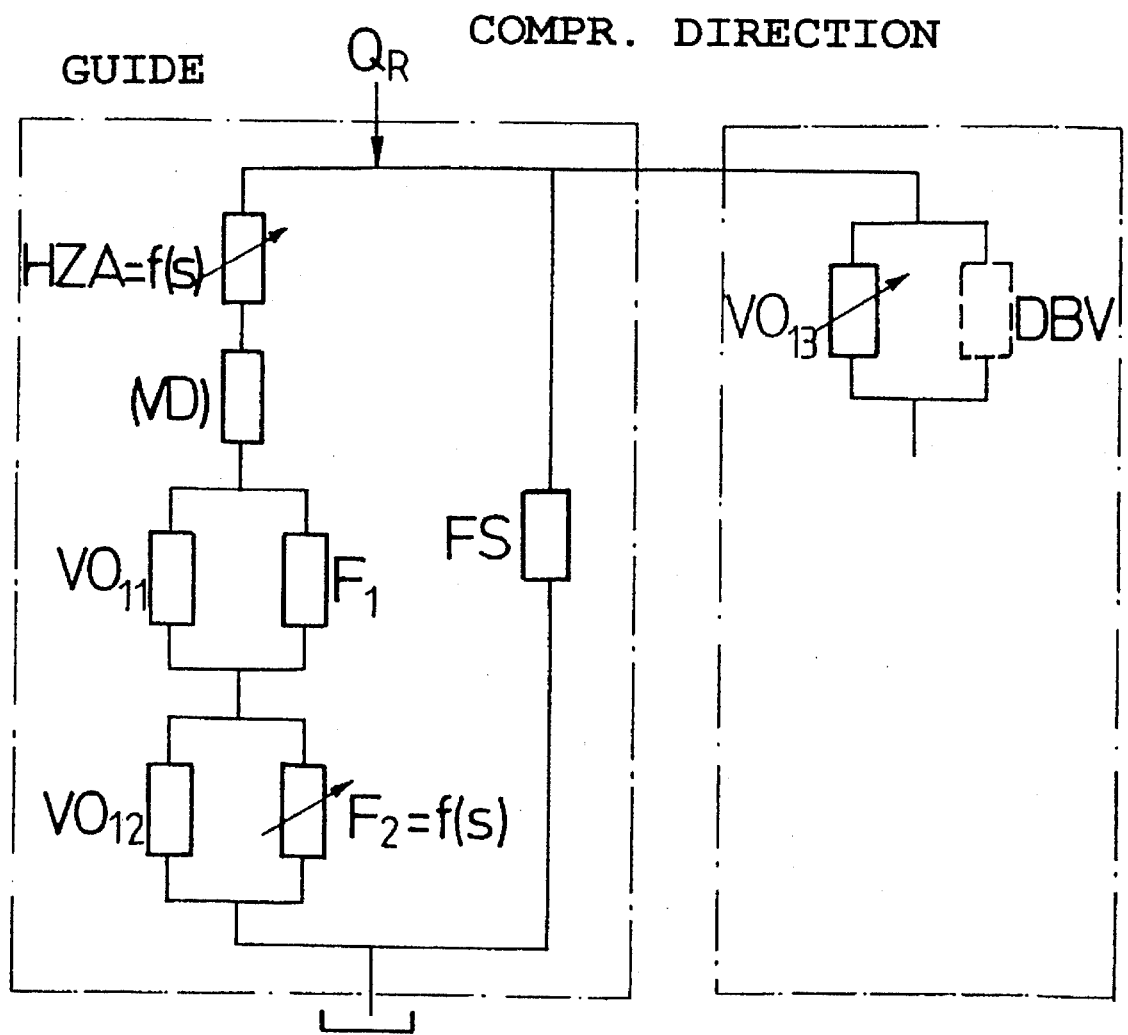
Figure 34:
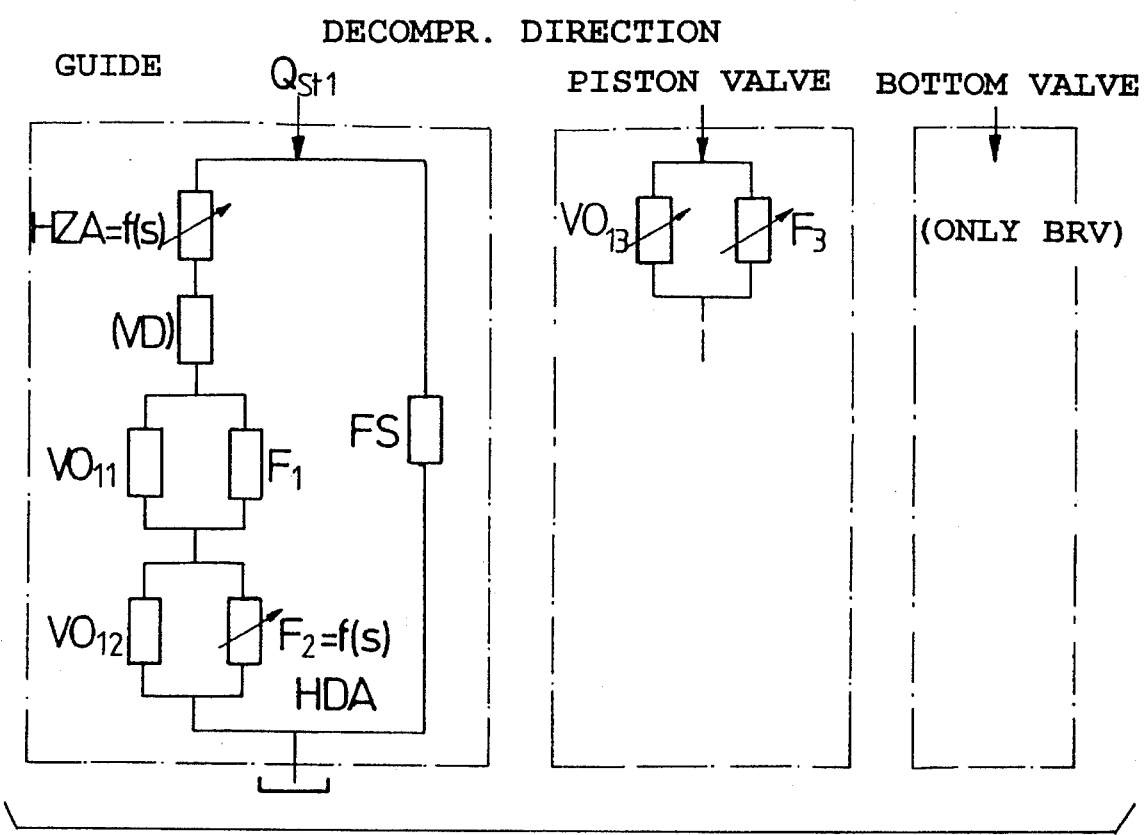

FIGS. 33 to 34 show the equivalent circuit diagrams for the shock absorbers described above. In the decompression direction (FIG. 33), the volume current QR, the volume of which corresponds to the piston-rod-side annulus, is divided into two currents. It is thereby assumed that the stroke position is in the position in which the hydraulic decompression stop is just engaged. As also described above, the action of the hydraulic decompression stop is a function of the stroke position, and therefore HZA=f (s). There can be—although there need not necessarily be—an advance opening VD, which is designed in the form of an inserted disc. Then the advance opening cross section $VO_{11}$ becomes active with a spring prestress F1, which is followed by the advance opening $VO_{12}$ with the spring prestress. The setting of F2 is done by means of the vehicle suspension spring 359. The guide gap FS between the piston rod and the piston rod guide simultaneously acts on the main current.

On the piston rod side, the advance opening cross section $VO_{13}$, which in the illustrated embodiment is either constant an adjustable, parallel to the main current. Under favorable conditions, and under some circumstances, it is even possible to omit an advance opening $VO_{13}$. A pressure relief valve DBV is connected parallel to the entire main current through the piston rod guide, and connects the two working chambers to one another in the event of peak pressures.

Because the volume current also flows through the valves of the piston rod guide in the compression direction, the main current, corresponding to the piston rod volume to be displaced QSt1, is very similar to the decompression direction. In the compression direction, the pressure pad also acts on the load-dependent valve $V_{12}$ with the spring force F2 as a hydraulic compression stop HDA. The volume of the working chamber on the side away from the piston rod acts on $VO_{13}$ with the spring F3, so that the damping forces of the damping valves in the piston rod guide and the piston are superimposed additively. This description applies to the case where a simple check valve BRV is used as the bottom valve. With a specified shock absorber size (cylinder area, piston rod area), the use of a bottom valve with damping valves can vary the ratio of decompression to compression damping.

Figure 35:
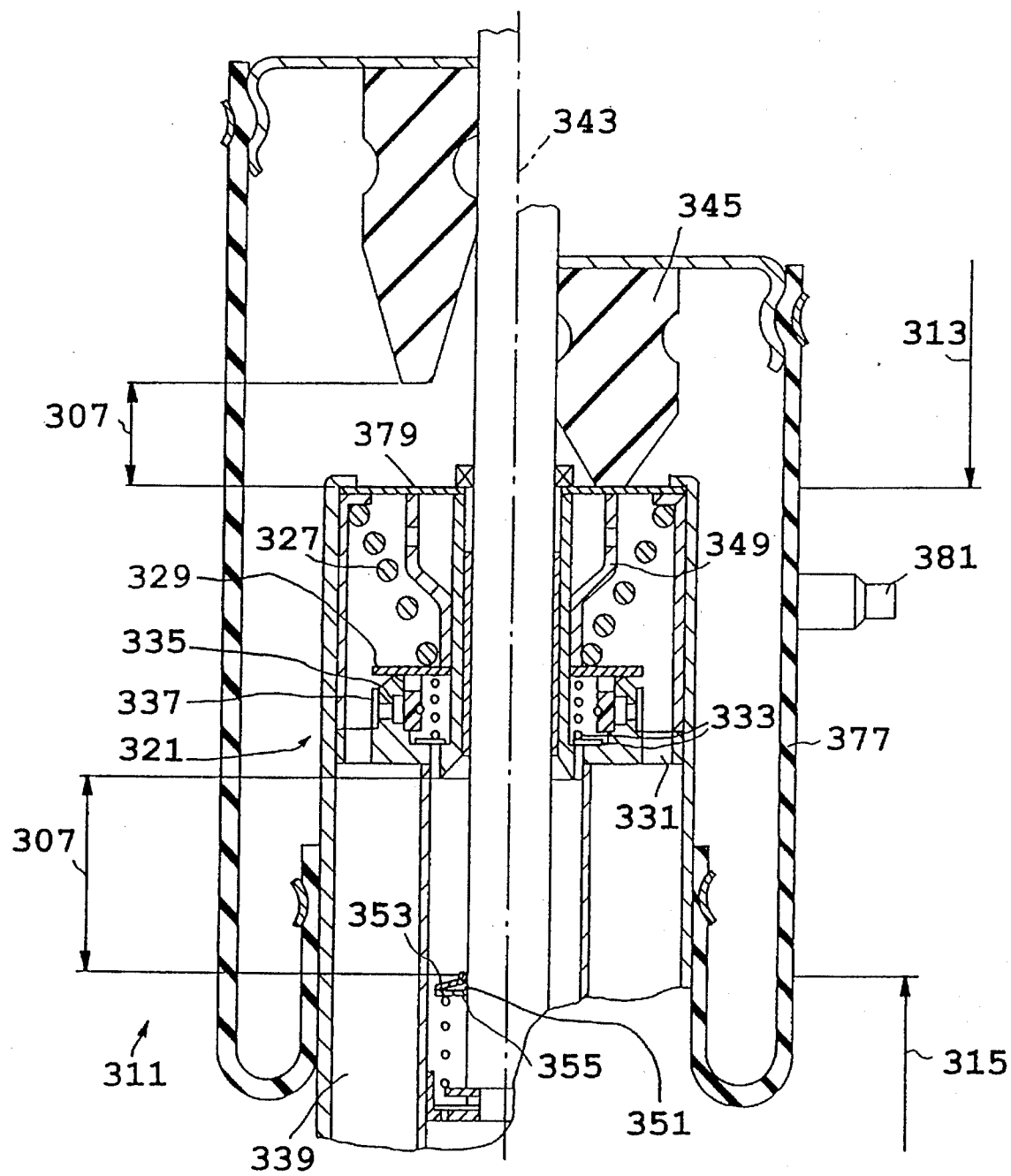

FIG. 35 shows a shock absorber with load-independent damping, on which there is a pneumatic spring with a level control system as a vehicle suspension spring. The essential structure is the same as illustrated in FIG. 29, with the distinction that a pneumatic spring designed as an expansion bellows 377 is used as the vehicle suspension spring.

The load-independent operation within the damping force family of characteristics 307 of the shock absorber 311 is based on a process whereby the air pressure inside the expansion bellows 377 pressurizes a membrane 379, which is sealed off from the equalization chamber 339 and is rigidly braced on the inside and outside diameter, independently of the valve disc 349.

The very degressive damping force of the damping device 321 is determined by the conical coil spring 327, and within the first damping force family of characteristics 307 no additional forces are exerted on the valve disc 329. Only after the transition between the first damping force family of characteristics 307 and the damping force family of characteristics 313 does a pressure pad 345 come in contact with the membrane 379, which acts via a control sleeve 349 to transmit the force to the valve disc 329, so that the rest of the stroke in the insertion direction of the piston rod 343 results in a sharply progressive damping force characteristic. There is a pneumatic connection 381 on the expansion bellows 377 to regulate the level.

Figure 36:
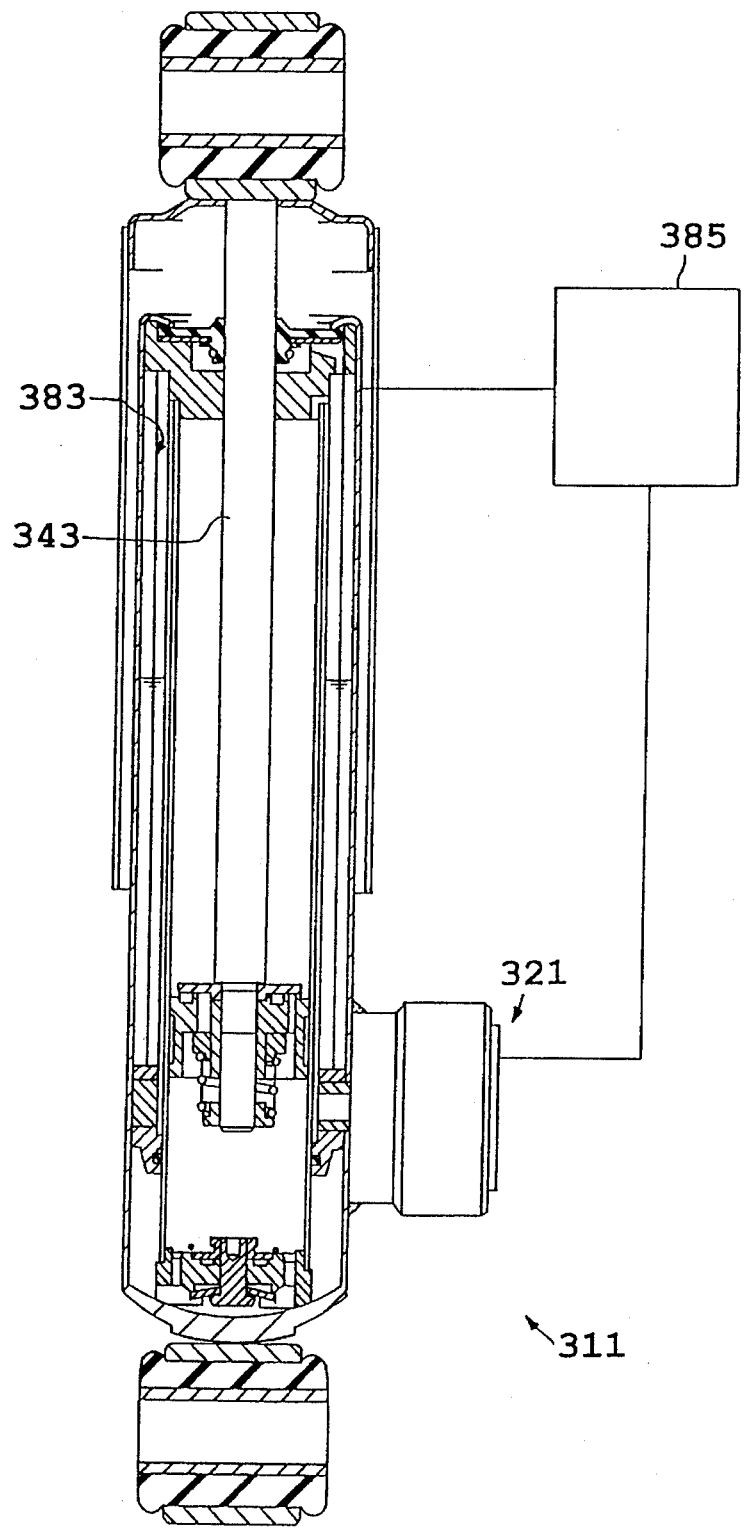

FIG. 36 shows a shock absorber 311 with a damping force which can be adjusted by means of a damping device 321 connected in parallel. The basic structure is the same as that of the known art, so that the description has been restricted to its essential features.

The shock absorber 311 is equipped with a position detection device 383 which senses the stroke length of the shock absorber 311. The signal generated by the position detection device 383 is transmitted to a computer 384 which has the damping force family of characteristics 301, among other things, stored in its memory. The normal position 309 of the shock absorber 311 can be determined by means of the position detection device 383. For example, after the vehicle ignition is turned on, the signal from the position detection device 383 can be defined as the reference signal. The position of the damping force family of characteristics 307 is thus clearly and very easily determined. The stroke length for the damping force family of characteristics 307 is also stored in the computer's memory. If a signal is transmitted to the computer by the position detection device 83 which corresponds to a stroke position outside the first damping force family of characteristics 307, then there is a continuous transition from the softening damping force setting, independent of the stroke direction, to a harder damping force setting of the damping device 321. The desired progressive damping force curve within the harder damping force setting can be very easily realized by continuously sensing the stroke position, and by hardening the damping force setting as the shock absorber approaches its limit positions.

It will be appreciated from the foregoing that the present invention, in at least one aspect thereof, can preferably be directed to a vehicle, comprising a vehicle body, a chassis with wheels and tires on which the vehicle rests, a number of vehicle suspension springs and shock absorbers which are mounted between the wheels and the vehicle body and execute a change in their axial length as a function of the wheel spring travel in the form of a displacement between a piston fastened to a piston rod guided by a piston rod guide, and a pressure tube of the shock absorber, and thereby displace a damping medium through a damping device, as well as means to fasten the piston rod and the pressure tube to the vehicle body and the wheel, characterized by the fact that the shock absorber has a damping force family of characteristics which consists of at least three individual damping force families of characteristics, the first damping force family of characteristics of which is designed so that it exerts a very low damping force, whereby this damping force family of characteristics is located in the vicinity of the normal spring deflection range of the shock absorber, and makes a transition in the decompression and compression directions respectively into damping force families of characteristics which entail a greater damping force in relation to the stroke length, compared to the first damping force family of characteristics.

One feature of the invention resides broadly in the vibration damper, the piston valve of which is fastened to a piston rod, comprising a piston body with fluid passage channels which are covered by valve discs on support or bearing bodies with valve support or bearing surfaces, whereby the piston, by means of at least one piston ring, divides a cylinder tube into two work chambers, characterized by the fact that the piston body 405 is realized in the shape of a disc, in one piece and by means of stamping.

Another feature of the invention resides broadly in the vibration damper characterized by the fact that starting from a piston base body 405c, the areas 419, 445 of the piston body which are raised on one side are designed as recesses 443 on the opposite side of the piston.

Yet another feature of the invention resides broadly in the vibration damper characterized by the fact that the piston body 405 has a support or bearing ring 433, the axial height of which matches or is adapted to the height of the support surfaces 427.

Still another feature of the invention resides broadly in the vibration damper characterized by the fact that for each direction of flow, several passage channels 405a, 405b are realized, which have different reference circle radii $r_2$, $r_1$.

A further feature of the invention resides broadly in the vibration damper characterized by the fact that when an advance opening cross section 431 is used, it is formed by a valve disc 415, 423, 429 in connection with at least one fluid passage channel 405a, 405b.

Another feature of the invention resides broadly in the vibration damper characterized by the fact that the valve disc(s) 423, 429 is/are realized unshielded and is/are braced flat on the valve support surfaces 427.

Yet another feature of the invention resides broadly in the vibration damper characterized by the fact that at least one valve disc 415, 423 is braced on the support surfaces 427 by means of a spring plate 417.

Still another feature of the invention resides broadly in the vibration damper characterized by the fact that on at least one side of the piston, there is an angle ring or a torsionally twisted piston ring 437 for the spring plate 417, which angle ring 417 performs a centering and support function.

A further feature of the invention resides broadly in the vibration damper characterized by the fact that the piston ring 411 covers the circumferential surface of the piston body 405 and is axially supported on the respective top and bottom of the piston, Another feature of the invention resides broadly in the vibration damper characterized by the fact that the piston ring 411 has a greater height than the piston body 405, so that pressure-dependent sealing lips 457, 459 are active.

Yet another feature of the invention resides broadly in the vibration damper characterized by the fact that the piston ring 411 is realized in an elastic manner, and is slipped over the piston body 405.

Still another feature of the invention resides broadly in the vibration damper characterized by the fact that the piston ring 411 is metallized or flame-sprayed or whirl-sintered onto the piston body 405.

A further feature of the invention resides broadly in the vibration damper characterized by the fact that the piston ring 411 has a piston ring joint 461, which is formed on one hand by a notch 463 at some distance from the upper and lower edge, and on the other hand by an extension 465 which essentially fills the notch 463.

Another feature of the invention resides broadly in the vibration damper characterized by the fact that the piston ring 411 consists of a reinforcement 469 which is in contact with the piston body 405, and a liner 471 on this reinforcement 469.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The components disclosed in the various publications, disclosed or incorporated by reference herein, may be used in the embodiments of the present invention, as well as, equivalents thereof.

The corresponding foreign patent publication applications, namely, Federal Republic of Germany Patent Application No. P 43 04 701, filed on Feb. 17, 1993, having inventor Manfred Grundei, and DE-OS P 43 04 701 and DE-PS P 43 04 701, and Federal Republic of Germany Patent Application No. P 44 03 196, filed on Feb. 3, 1994, and DE-OS P 44 03 196 and DE-PS 44 03 196, are hereby incorporated by reference as if set forth in their entirety herein.

The corresponding foreign patent publication applications, namely, Federal Republic of Germany Patent Application No. P 44 10 996.2, filed on Mar. 30, 1994, having inventors Manfred Grundei and Hans Reimer, and DE-OS P 44 10 996.2 and DE-PS P 44 10 996.2, are hereby incorporated by reference as if set forth in their entirety herein.

Examples of shock absorber assemblies which may be utilized in accordance with the embodiments of the present invention may be found in the following U.S. Pat. No. 4,838,393, entitled "Hydro-mechanical Stop having a Restrictive Passage", which issued to Mourray et al. on Jun. 13, 1989; U.S. Pat. No. 4,817,928, entitled "Suspension System", which issued to Paton on Apr. 4, 1989; U.S. Pat. No. 4,527,674, entitled "Shock Absorber with a Hydro-mechanical Stop", which issued to Mourray on Jul. 9, 1985; U.S. Pat. No. 4,962,916, entitled "Compression Spring", which issued to Palinkas on Oct. 16, 1990; and U.S. Pat. No. 4,756,516, entitled "Resiliently Deformable Element Usable as an End Stop in a Motor Vehicle Suspension", which issued to Tondato on Jul. 12, 1988.

Examples of processes which may be utilized on accordance with the embodiments of the present invention, may be found in the following U.S. Pat. No. 5,301,414, which issued to Gautheron on Jul. 20, 1992 and U.S. Pat. No. 3,768,289 to VSI Corporation.

Examples of control arrangements, which may be utilized in accordance with the embodiments of the present invention, may be found in the following U.S. Pat. No. 4,989,148, which issued to Gürke et al. on Jan. 29, 1991; U.S. Pat. No. 4,765,648, which issued to Mander et al. on Aug. 23, 1988; U.S. Pat. No. 4,664,409, which issued to Nakashima et al. on May 12, 1987; U.S. Pat. No. 4,869,528, which issued to Buma et al. on Sep. 26, 1989; and U.S. Pat. No. 4,853,860, which issued to Achenbach on Aug. 1, 1989.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A piston in a shock absorber, said piston being attached to a piston rod, said piston comprising:

a piston body being formed by a substantially solid body of metal which has been deformed into shape by a stamping operation utilizing two die portions;

said piston body including a plurality of raised and recessed portions on each side of the piston body;

the raised portions on one side being opposite the recessed portions on the other side such that said piston body has a substantially constant thickness;

said piston including a circumferential seal between the piston body and a cylinder of the shock absorber; and said seal having a longitudinal width greater than the thickness of the piston body.

2. The piston of claim 1, wherein:

said piston comprises a plurality of damping passages;

said damping passages are disposed within at least a portion of said raised and recessed portions.

3. The piston of claim 2, wherein:

said piston comprises at least one valve disc;

said at least one valve disc is disposed on the piston rod; and said at least one valve disc is disposed to cover at least a portion of at least one of said damping passages.

4. The piston of claim 3, wherein:

said piston body comprises a center;

said piston body comprises a circumference;

said plurality of damping passages comprises a first plurality of damping passages and a second plurality of damping passages;

each of said damping passages comprises a center;

the center of each of said first plurality of damping passages is disposed a first distance from the piston body center in a direction towards the piston body circumference;

the center of each of said second plurality of damping passages is disposed a second distance from the piston body center in a direction towards the piston body circumference; and said first distance is different from said second distance.

5. The piston of claim 4, wherein:

said piston comprises means for supporting said at least one valve disc adjacent to and in contact with at least a portion of said raised portions.

6. The piston of claim 5, wherein:

said valve disc support means comprises a support ring.

7. The piston of claim 6, wherein:

said valve disc is disposed to cover only a portion of at least one of said damping passages for permitting unobstructed damping fluid flow through an uncovered portion of said at least one damping passage.

8. The piston of claim 7, wherein:

said piston comprises means for biasing said at least one valve disc against said at least a portion of said raised portions adjacent to and in contact with said valve disc; and said means for biasing comprises a spring plate.

9. The piston of claim 8, wherein:

said piston comprises means for supporting and centering said spring plate; and said means for supporting and centering comprises an angle ring disposed on said piston rod of said piston body.

10. The piston of claim 9, wherein:

said circumferential seal is supported on each of said sides of said piston body.

11. The piston of claim 10, wherein:

said circumferential seal is continuous circumferentially around said piston body; and said circumferential seal comprises an elastic material for permitting the slipping of said circumferential seal over said piston body during assembly.

12. The piston of claim 10, wherein:

said circumferential seal comprises a joint;

said joint comprises two opposing surfaces;

one of said opposing surfaces comprises a notch; and the other of said opposing surfaces comprises an extension for fitting within said notch.

13. The piston of claim 1, wherein:

said circumferential seal is supported on each of said sides of said piston body.

14. The piston of claim 13, wherein:

said circumferential seal is continuous circumferentially around said piston body; and said circumferential seal comprises an elastic material for permitting the slipping of said circumferential seal over said piston body during assembly.

15. The piston of claim 13, wherein:

said circumferential seal comprises a joint;

said joint comprises two opposing surfaces;

one of said opposing surfaces comprises a notch; and the other of said opposing surfaces comprises an extension for fitting within said notch.

* * * * *

UNITED STATES PATENT AND TRADEMARK OFFICE
CERTIFICATE OF CORRECTION

PATENT NO. : 5,615,756
DATED : April 1, 1997
INVENTOR(S) : Manfred GRUNDEI and Hans REIMER It is certified that error appears in the above-identified patent and that said Letters Patent is hereby corrected as shown below:

In column 17, line 24, after 'rod', delete "34p" and insert --343--.

In column 19, line 61, after 'device', delete "83" and insert --383--.

In column 23, lines 33-34, Claim 9, after 'rod' delete "of said piston body".

Signed and Sealed this

Twelfth Day of August, 1997

Attest:

BRUCE LEHMAN

Attesting Officer

Commissioner of Patents and Trademarks